United States Patent
Cseri et al.

(10) Patent No.: US 10,997,005 B1
(45) Date of Patent: May 4, 2021

(54) ESTABLISHING DATA OBJECTS TO FACILITATE CALLS TO EXTERNAL FUNCTIONS

(71) Applicant: Snowflake Inc., San Mateo, CA (US)

(72) Inventors: Istvan Cseri, Seattle, WA (US); Isaac Kunen, Seattle, WA (US); Igor Zinkovsky, Redmond, WA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 17/028,466

(22) Filed: Sep. 22, 2020

Related U.S. Application Data

(63) Continuation of application No. 16/942,646, filed on Jul. 29, 2020, now Pat. No. 10,846,157, which is a continuation of application No. 16/821,430, filed on Mar. 17, 2020, now Pat. No. 10,810,067, which is a continuation of application No. 16/666,911, filed on Oct. 29, 2019, now Pat. No. 10,628,244.

(51) Int. Cl.
| | |
|---|---|
| *G06F 9/44* | (2018.01) |
| *G06F 9/54* | (2006.01) |
| *G06F 16/242* | (2019.01) |
| *H04L 29/06* | (2006.01) |
| *H04L 29/08* | (2006.01) |

(52) U.S. Cl.
CPC .......... *G06F 9/548* (2013.01); *G06F 16/2448* (2019.01); *H04L 63/0414* (2013.01); *H04L 63/108* (2013.01); *H04L 67/2823* (2013.01); *G06F 2209/549* (2013.01)

(58) Field of Classification Search
CPC ..................................................... G06F 9/548
USPC ............................................................ 719/330
See application file for complete search history.

(56) References Cited

U.S. PATENT DOCUMENTS

| | | |
|---|---|---|
| 7,769,825 B2 | 8/2010 | Karakashian et al. |
| 9,246,912 B2 | 1/2016 | Alexander et al. |
| 9,503,452 B1 | 11/2016 | Kumar et al. |
| 10,180,973 B2 | 1/2019 | Shivarudraiah et al. |

(Continued)

OTHER PUBLICATIONS

"U.S. Appl. No. 16/666,911, Notice of Allowance dated Dec. 31, 2019".

(Continued)

*Primary Examiner* — Timothy A Mudrick
(74) *Attorney, Agent, or Firm* — Schwegman Lundberg & Woessner, P.A.

(57) ABSTRACT

A query referencing a function associated with a remote software component is received by a network-based data warehouse system. Temporary security credentials corresponding to a role at a cloud computing service platform are obtained. The role has permission to send calls to a web endpoint corresponding to the remote software component. A request comprising input data and electronically signed using the temporary security credentials is sent to a web Application Programming Interface (API) management system of the cloud computing service platform. The request, when received by the web API management system, causes the web API management system to invoke external functionality provided by the remote software component at the web endpoint with respect to the input data. A response comprising a result of invoking the external functionality is received from the web API management system, and the result data is processed according to the query.

30 Claims, 14 Drawing Sheets

(56) References Cited

U.S. PATENT DOCUMENTS

| | | |
|---|---|---|
| 10,628,244 B1 | 4/2020 | Cseri et al. |
| 10,810,067 B1 | 10/2020 | Cseri et al. |
| 10,846,157 B1 | 11/2020 | Cseri et al. |
| 2017/0237729 A1* | 8/2017 | Uppalapati ............. H04L 63/20 726/8 |
| 2019/0347680 A1 | 11/2019 | Layman |

OTHER PUBLICATIONS

"U.S. Appl. No. 16/821,430, Non Final Office Action dated May 21, 2020", 11 pgs.
"U.S. Appl. No. 16/821,430, Notice of Allowability dated Sep. 16, 2020", 2 pgs.
"U.S. Appl. No. 16/821,430, Notice of Allowance dated Sep. 4, 2020", 7 pgs.
"U.S. Appl. No. 16/821,430, Response Filed Aug. 17, 2020 to Non Final Office Action dated May 21, 2020", 11 pgs.
"U.S. Appl. No. 16/942,646, Notice of Allowance dated Aug. 19, 2020", 9 pgs.
"International Application Serial No. PCT/US2020/044447, International Search Report dated Aug. 26, 2020", 2 pgs.
"International Application Serial No. PCT/US2020/044447, Written Opinion dated Aug. 26, 2020", 3 pgs.
"U.S. Appl. No. 16/942,646, Supplemental Notice of Allowability dated Oct. 23, 2020", 2 pgs.

* cited by examiner

ESTABLISHING DATA OBJECTS TO FACILITATE CALLS TO EXTERNAL FUNCTIONS

CROSS-REFERENCE TO RELATED APPLICATIONS

This application is a Continuation of U.S. patent application Ser. No. 16/942,646, filed on Jul. 29, 2020, which is a Continuation of U.S. patent application Ser. No. 16/821,430 filed Mar. 17, 2020, which is a Continuation of U.S. patent application Ser. No. 16/666,911, filed on Oct. 29, 2019 and issued on Apr. 21, 2020 as U.S. Pat. No. 10,628,244, the contents of which are incorporated herein in their entireties.

TECHNICAL FIELD

Embodiments of the disclosure relate generally to a network-based data warehouse and, more specifically, to calling external functions from a network-based data warehouse.

BACKGROUND

A cloud data warehouse (also referred to as a "network-based data warehouse" or simply as a "data warehouse") is a network-based system used for data analysis and reporting that comprises a central repository of integrated data from one or more disparate sources. A cloud data warehouse can store current and historical data that can be used for creating analytical reports for an enterprise. To this end, data warehouses typically provide business intelligence tools, tools to extract, transform, and load data into the repository, and tools to manage and retrieve metadata.

In some instances, a user of the network-based data warehouse may wish to make use of functionality that is external to the data warehouse system to analyze or otherwise process data stored by the data warehouse. For example, a user may wish to utilize functionality provided by a third party (e.g., a third-party geocoder) within the context of the network-based data warehouse. As another example, a user may wish to encode or reuse existing business logic (e.g., a complex loss calculation or a machine learning algorithm) within the context of the data warehouse. As yet another example, a user may wish to notify or otherwise trigger external functionality such as a notification system within the context of a data warehouse. As still another example, a user may wish to export data from the cloud warehouse in a way that is driven from within the context of the data warehouse. However, conventional cloud data warehouses do not provide users an ability to call out to a remote software component (e.g., code) that can provide such functionality.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
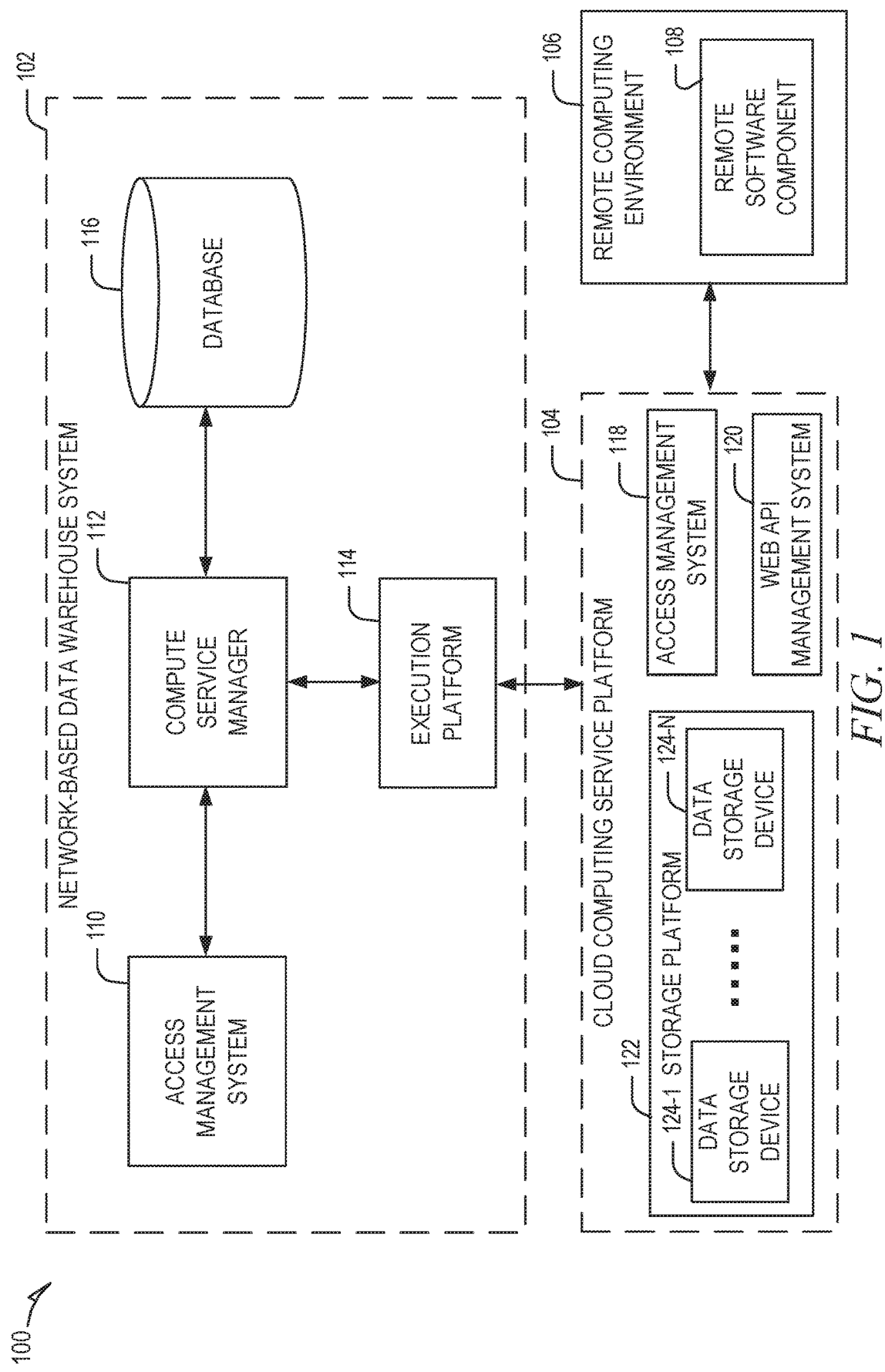
FIG. 1 illustrates an example computing environment in which a network-based data warehouse system invokes external functionality provided by a remote software component, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, conventional network-based data warehouses do not provide users with the ability to call out to a remote software component that provides functionality that is external to the data warehouse. Aspects of the present disclosure address the above and other deficiencies of conventional data warehouses by providing a network-based data warehouse system that provides users an ability to invoke external functionality provided by a remote software component. The network-based data warehouse system described herein provides an ability to bind a function (e.g., a Structured Query Language (SQL) function), table function, or procedure to remote software code that is external to the data warehouse and exposed as a web application programming interface (API).

The network-based data warehouse system provides users a mechanism to author functions and stored procedures, that are backed by externally implemented web endpoints (e.g., HyperText Transfer Protocol (HTTP) Representational State Transfer (REST) endpoints) in an externally managed web API management system provided a cloud computing service platform (e.g., Amazon Web Services® (AWS), Microsoft Azure®, or Google Cloud Services®). Users are responsible for provisioning web endpoints and configuring the endpoints based on business logic within the storage platform. In some instances, the web API management system proxy requests to Lambda functions, and in other instances, the web API management system transforms and forwards the requests to third-party software components that are external to the data warehouse system. The network-based data warehouse system enables external functions provided by these external software components to be used in queries like user defined functions, user-defined table functions and stored procedures.

The network-based data warehouse system stores various data objects to enable the invocation of external functionality provided by remote software components. The data objects store information that is used by the network-based data warehouse to obtain temporary security credentials to be used in invoking the external functionality via a web API management system provided by a cloud computing platform. During execution of a query, the network-based data warehouse system authenticates with a target endpoint, via an authentication system of the cloud computing service platform, using the temporary security credentials, and invokes functionality at the endpoint with batches of target data as defined in the query. Target data may, for example, comprise binary data, JavaScript Object Notation (JSON) encoded data or other textual formats such as eXtensible Markup Language (XML). Target data may be passed inline with HTTP requests/responses or written to a commonly accessed storage provided by the cloud computing service platform (e.g., Amazon® Simple Storage Service (S3®)). User data stored by the network-based data warehouse system is encoded in a format suitable to be passed through HTTP requests and responses.

From the perspective of a user, external code can be made a seamless part of the data warehouse functionality similar to any internally-defined function or procedure. That is, the data warehouse can access systems that are, by their nature, external to the data warehouse (e.g., geocoding systems). Further, users are enabled to use any arbitrary external code regardless of the language used to author the code or the system on which the code executes. Moreover, the network-based data warehouse described herein allows users to invoke external functionality while avoiding security concerns that can arise from executing the code within the data warehouse system and do so in a manner that is orthogonal to the functionality of the data warehouse (e.g., an external function can be used in any query). In addition, the technique for invoking external functionality from the data warehouse externalizes security-sensitive authentication information since this information is handled by the cloud computing service platform rather than the network-based data warehouse itself.

In an example, a user of the network-based data warehouse has built a score function using a machine-learning algorithm and has deployed a scoring API to facilitate calls to the score function. The user can bind a function within the network-based data warehouse to the external code and issue an SQL query to the network-based data warehouse that references the function to score a set of input values. When executing the query, the network-based data warehouse accesses the set of input values, makes a call to the score function API, and incorporates the results received from the external score function.

FIG. 1 illustrates an example computing environment 100 in which a network-based data warehouse system 102 invokes an external function provided by a remote software component, in accordance with some embodiments of the present disclosure. To avoid obscuring the inventive subject matter with unnecessary detail, various functional components that are not germane to conveying an understanding of the inventive subject matter have been omitted from FIG. 1 and subsequent FIGS. 2-4. However, a skilled artisan will readily recognize that various additional functional components may be included as part of the computing environment 100 to facilitate additional functionality that is not specifically described herein.

As shown, the computing environment 100 comprises the network-based data warehouse system 102, a cloud computing service platform 104 (e.g., AWS®, Microsoft Azure®, or Google Cloud Services®), and a remote computing environment 106. The data warehouse system 102 is a network-based system used for reporting and analysis of integrated data from one or more disparate sources (e.g., the cloud computing service platform 104). The cloud computing service platform 104 comprises a plurality of computing machines and provides on-demand computer system resources such as data storage and computing power to the network-based data warehouse system 102.

The remote computing environment 106 comprises one or more computing machines that execute a remote software component 108 to provide additional functionality to users of the network-based data warehouse system 102. In some embodiments, the remote computing environment 106 may be included in or provided by the cloud computing service platform 104.

The remote software component 108 comprises a set of machine-readable instructions (e.g., code) that, when executed by the remote computing environment 106, cause the remote computing environment 106 to provide certain functionality. The remote software component 108 may operate on input data and generates result data based on processing, analyzing, or otherwise transforming the input data. As an example, the remote software component 108 may comprise a scalar function, a table function, or a stored procedure. External scalar functions can, for example, be used as a mechanism to trigger actions in external systems, which can enhance existing extract, transform, load (ETL) pipelines or enable entirely new data processing scenarios. For example, an external scalar function can be used to send an email or notification or to start a machine learning training job in a component of the cloud computing service platform 104. External stored procedures can, for example, run nested SQL queries in the context of the same session that called the stored procedure.

The network-based data warehouse system 102 comprises an access management system 110, a compute service manager 112, an execution platform 114, and a database 116. The access management system 110 is the internal access control system for the network-based data warehouse system 102 and enables administrative users to manage access to resources and services provided by the network-based data warehouse system 102. Administrative users can create and manage users, roles, and groups, and use permissions to allow or deny access to resources and services.

The compute service manager 112 coordinates and manages operations of the network-based data warehouse system 102. The compute service manager 112 also performs query optimization and compilation as well as managing clusters of computing services that provide compute resources (also referred to as "virtual warehouses"). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored the computing environment 100. The database 116 stores data pertaining to various functions and aspects associated with the network-based data warehouse system 102 and its users. For example, the database 116 stores various data objects that enable the network-based data warehouse system 102 to invoke external functionality provided by the remote software component 108. Further details regarding creation and use of these data objects are discussed below in reference to FIGS. 2-11.

In some embodiments, database 116 includes a summary of data stored in remote data storage systems as well as data available from a local cache. Additionally, database 116 may include information regarding how data is organized in the remote data storage systems and the local caches. Database 116 allows systems and services to determine whether a piece of data needs to be accessed without loading or accessing the actual data from a storage device.

The compute service manager 112 is further coupled to the execution platform 114, which provides multiple computing resources that execute various data storage and data retrieval tasks. Execution platform 114 is coupled to storage platform 122 provided by the cloud computing service platform 104. The storage platform 12.2 comprises multiple data storage devices 124-1 to 124-N. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3™ storage systems or any other data storage technology. Additionally, cloud computing service platform 104 may include distributed file systems (such as Hadoop Distributed File Systems (HDFS)), object storage systems, and the like.

The execution platform 114 comprises a plurality of compute nodes. A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing service platform 104 also comprises an access management system 118 and a web API management system 120. The access management system 118 is an access control system provided by the cloud computing service platform 104 that allows users to create and manage users, roles, and groups, and use permissions to allow or deny access to cloud services and resources within the context of the cloud computing service platform 104. A user can, for example, create a role within the context of the cloud computing service platform 104 that has permissions to make web calls to the remote software component 108 via the web API management system 120. The access management system 110 of the network-based data warehouse system 102 and the access management system 118 of the cloud computing service platform 104 can communicate and share information so as to enable access and management of resources and services shared by users of both the network-based data warehouse system 102 and the cloud computing service platform 104.

The web API management system 120 handles tasks involved in accepting and processing concurrent API calls, including traffic management, authorization and access control, monitoring, and API version management. The web API management system 120 provides HTTP proxy service for creating, publishing, maintaining, securing, and monitoring APIs (e.g., REST APIs).

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. This architecture supports dynamic changes to the network-based data warehouse 102 based on the changing data storage/retrieval needs as well as the changing needs of the users and systems accessing data processing platform 700. The support of dynamic changes allows network-based data warehouse 102 to scale quickly in response to changing demands on the systems and components within network-based data warehouse 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 112, database 116, execution platform 114, cloud computing service platform 104, and remote computing environment 106 are shown in FIG. 1 as individual components. However, each of compute service manager 112, database 116, execution platform 114, cloud computing service platform 104, and remote computing environment may be implemented as a distributed system (e.g., distributed across multiple systems/platforms at multiple geographic locations). Additionally, each of compute service manager 112, database 116, execution platform 114, and cloud computing service platform 104 can be scaled up or down (independently of one another) depending on changes to the requests received and the changing needs of data processing platform 700. Thus, in the described embodiments, the network-based data warehouse 102 is dynamic and supports regular changes to meet the current data processing needs.

During typical operation, the network-based data warehouse 102 processes multiple jobs determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing service platform 104. It is desirable to retrieve as much data as possible from caches within the execution platform 114 because the retrieval speed is typically much faster than retrieving data from the cloud computing service platform 104.

As shown in FIG. 1, the computing environment 100 separates the execution platform 114 from the cloud computing service platform 104. In this arrangement, the processing resources and cache resources in the execution platform 114 operate independently of the data storage resources 124-1 to 124-*n* in the cloud computing service platform 104. Thus, the computing resources and cache resources are not restricted to specific data storage resources 124-1 to 124-*n*. Instead, all computing resources and all cache resources may retrieve data from, and store data to, any of the data storage resources in the cloud computing service platform 104.

Figure 2:
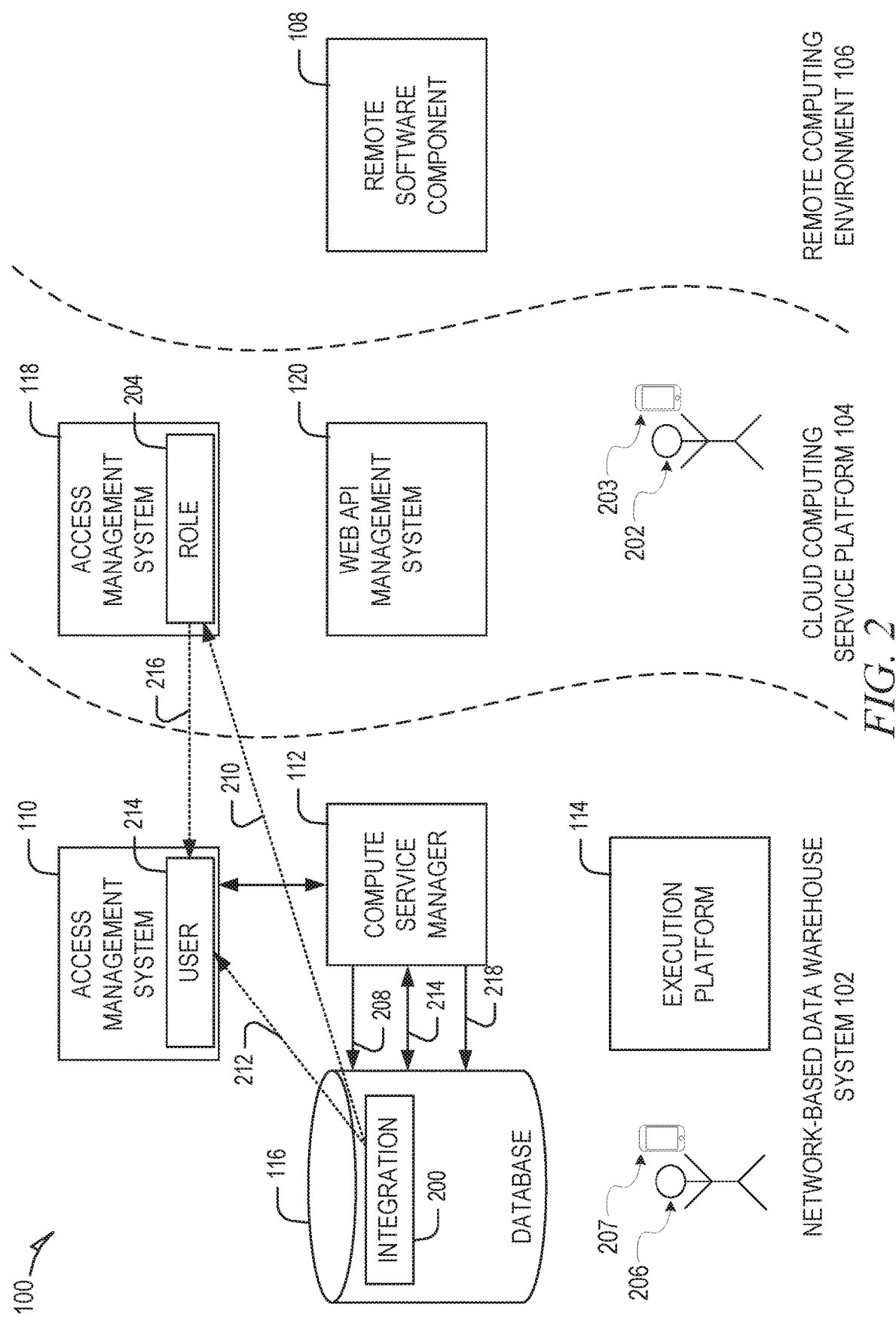
FIG. 2 is a data flow diagram illustrating creation of an integration object within the computing environment, in accordance with some embodiments of the present disclosure.

FIG. 2 is a data flow diagram illustrating creation of an integration object 200 within the computing environment 100, in accordance with some embodiments of the present disclosure. As shown, an administrative user 202 of the cloud computing service platform 104 uses the access management system 118 of the cloud computing service platform 104 to create a role 204. A role in the context of the cloud computing service platform 104 is an identity with a set of permissions for making services requests within the cloud computing service platform 104. A role is similar to a user in that it is an identity with permission policies that determine what the identity can do within the cloud computing service platform 104, but rather than being uniquely associated with a single person like a user, a role is an identity that can be assumed by multiple users. A role also does not have long-term security credentials; instead, a user that is assuming a role is provided temporary security credentials that expire after an expiration time.

The administrative user 202 of the cloud computing service platform 104 creates the role 204 with permission to call web endpoints corresponding to the remote software component 108. For example, the administrative user 202 can utilize a user interface provided to computing device 203 by the cloud computing service platform 104 to provide appropriate input to cause the access management system 118 to create the role 204.

The cloud computing service platform 104 assigns a resource identifier to the role 204. The administrative user 202 interacts further with the access management system 118 using the UI provided to computing device 203 to obtain the resource identifier associated with the role 204 and communicates this resource identifier to an administrative user 206 of the network-based data warehouse system 102.

At 208, the compute service manager 112 creates the integration object 200 in the database 116 based on input provided by the administrative user 206 including the resource identifier associated with the role 204 and a scheme for allowing/denying web calls based on target uniform resource locators (URLs). As an example, the administrative user 206 can utilize a UI provided to computing device 207 by the network-based data warehouse system 102 to provide the input and cause the compute service manager 112 to create the integration object 200.

The scheme for allowing/denying web calls can comprise a whitelist of permissible URLs to which web calls may be made, a blacklist of impermissible URLs to which web calls are not permitted, or both. In general, the scheme is used by the compute service manager 112 to restrict which endpoints can be used with the integration. The integration object 200 generated by the compute service manager 112 includes: a reference 210 to the resource identifier associated with the role 204, a reference 212 to a resource identifier associated with a user record 214, and the scheme defining allowed/restricted URLs. In some embodiments, the integration object 200 may further comprise a reference to an external identification (ID) string generated by the compute service manager 112. The external ID string generated by the compute service manager 112 can be used to establish a trust relationship between the role 204 and the user record 214.

The access management system 110 can maintain a pool of user records and can select the user record 214 to assign to and include in the integration object 200. At 216, the administrative user 206 interacts with the compute service manager 112 to extract the resource identifier of the user record 214 and the external ID string included in the integration object 200 and communicates the resource identifier of the user record 214 and the external ID string to the administrative user 202 in an out-of-band communication.

The administrative user 202 interacts with the access management system 118 to establish a trust relationship between the role 204 and the user record 214 to enable a user corresponding to the user record 214 to assume the role 204 and send web calls to the remote software component 108 via the web API management system 120. As a result, the role 204 is updated to include a reference 216 to the user record 214.

At 218, the compute service manager 112 grants usage rights to the integration object 200 to one or more users associated with the administrative user 206 based on input provided by the administrative user 206 via the IR provided to computing device 207.

Figure 3:
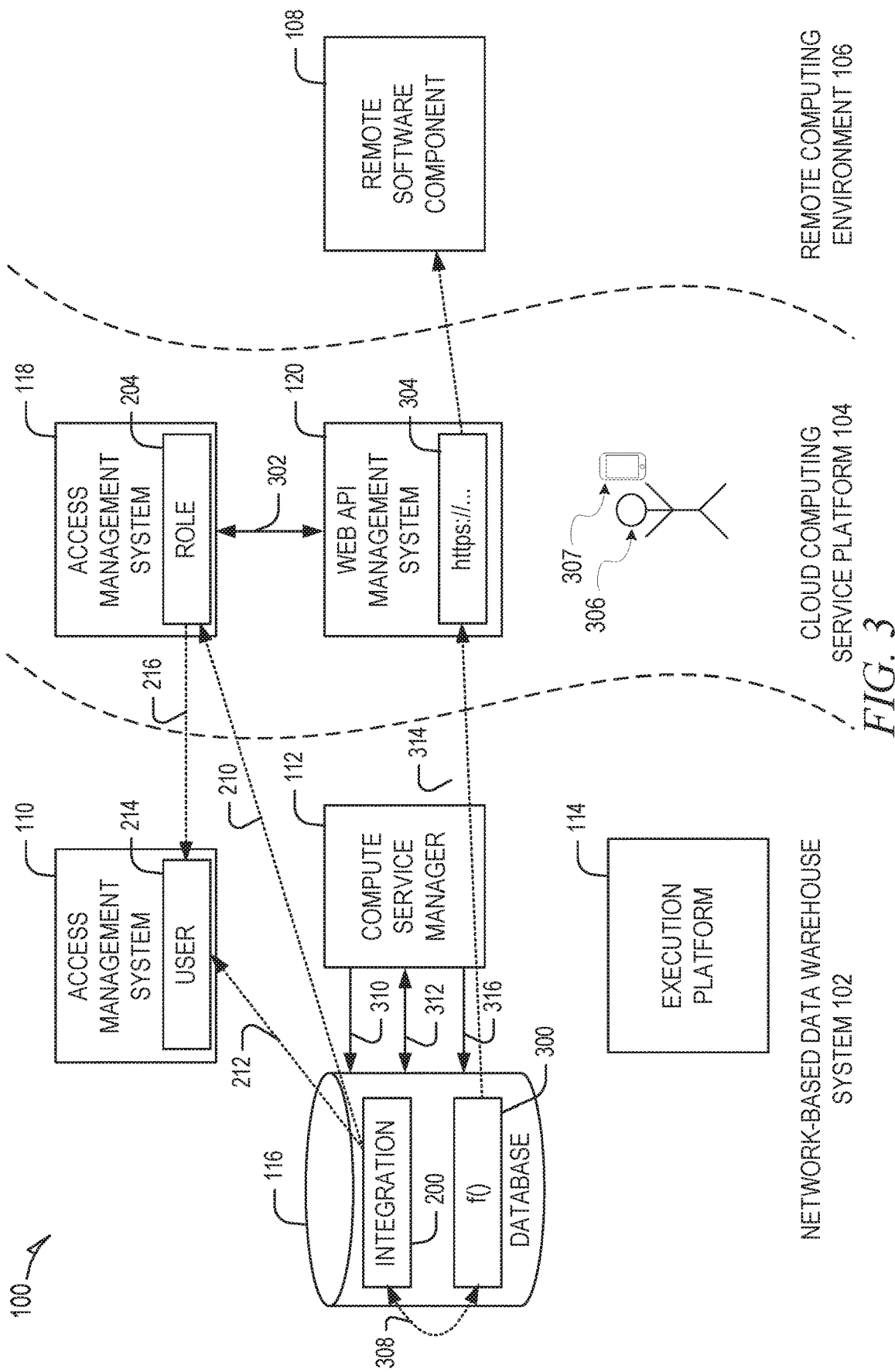
FIG. 3 is a data flow diagram illustrating creation of a function object within the computing environment, in accordance with some embodiments of the present disclosure.

FIG. 3 is a data flow diagram illustrating creation of a function object 300 within the computing environment 100, in accordance with some embodiments of the present disclosure. As shown, at 302, the web API management system 120 is configured to include a target web endpoint 304 (also referred to herein simply as "target endpoint 304") corresponding to the remote software component 108. The target endpoint 304 can comprise a uniform resource locator (URL) corresponding to the remote software component 108. The web API management system 120 is configured by a function author 306 using a UI provided to computing device 307 by the cloud computing service platform 104. The function author 306 is a user with access to an account with the cloud computing service platform 104 and an account with the network-based data warehouse system 102. The target endpoint 304 is configured to be authenticated by the access management system 118 of the cloud computing service platform 104 using a resource policy that allows permissions granted to the role 204 to be invoked.

The compute service manager 112 receives a function definition from the computing device 307. The function definition can be specified by the function author 306 using a UI provided to the computing device 307 by the network-based data warehouse system 102. The function definition identifies the integration object 200 and the target endpoint 304. In some embodiments, the function definition can comprise a maximum batch size for batching rows into requests sent to the web API management system 120.

The compute service manager 112 (at 310) checks whether the URL for the target endpoint 304 is allowed by the scheme that defines allowed/restricted URLs. If not, the compute service manager 112 rejects the function definition. Otherwise, the compute service manager 112 creates the function object 300 in the database 116 (at 312). The function object 300 defines a function that can be used in a query (e.g., SQL query) to invoke the external functionality provided by the remote software component 108. The function object 300 comprises a reference 308 (e.g., a pointer) to the integration object 200 and a reference 314 to the target endpoint 304 (e.g., a URL corresponding to the target endpoint 304). At 316, the compute service manager 112 grants usage rights to the function object 300 to one or more users of the network-based data warehouse system 102 based on input provided by the function author 306 via the UI provided to computing device 307.

Figure 4:
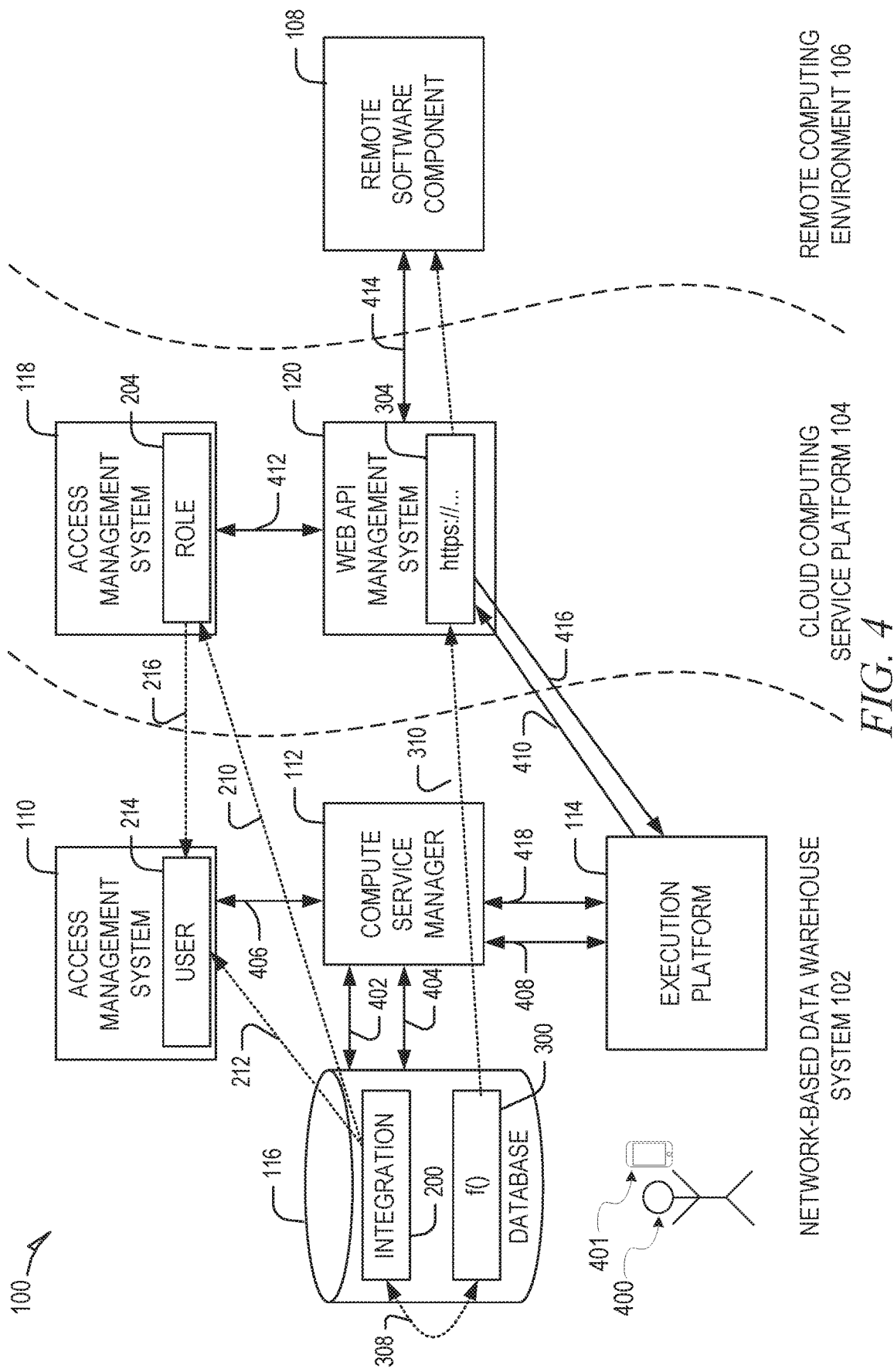
FIG. 4 is a data flow diagram illustrating invocation of external functionality provided by the remote software component by a network-based data warehouse within the computing environment, in accordance with some embodiments of the present disclosure.

FIG. 4 is a data flow diagram illustrating invocation of an external function provided by remote software component 108 by the network-based data warehouse system 102 within the computing environment 100, in accordance with some embodiments of the present disclosure. The invocation of the external function is initiated by a function caller 400 issuing a query to the compute service manager 112 using a computing device 401 in communication with the compute service manager 112. The function caller 400 is a user of the network-based data warehouse system 102. The query comprises an invocation of the function defined by the function object 300 and indicates a set of input data for the function.

At 402, the compute service manager 112, in response to receiving the query from the computing device 401 of the function caller 400, accesses information from the integration object 200 and the function object 300 to verify that the function caller 400 has appropriate usage rights to invoke the function and to verify that the target endpoint of the function (e.g., endpoint 304) is allowed based on the scheme defining allowable/restricted URLs (e.g., the whitelist and/or blacklist).

If the function caller 400 has appropriate usage rights and the target endpoint is allowed, the compute service manager 112, at 406, obtains the resource identifier associated with the user record 214, the resource identifier associated with the role 204, and long-term security credentials associated with the user record 214. The long-term security credentials can be encrypted to mitigate against unauthorized access and can be stored in the database 116, a cache memory component of the compute service manager 112, or both.

At 406, the compute service manager 112 works in conjunction with the access management system 110 to obtain temporary security credentials for assuming the role 204. The temporary security credentials expire after a time limit is reached (e.g., 1 hour). The temporary security credentials are also limited in scope for use specifically in sending requests to the remote software component 108. The temporary security credentials can be obtained by transmitting a request to the access management system 118 of the cloud computing service platform 104 for the temporary security credentials. The request can comprise or indicate the resource identifier corresponding to the user record 214, the resource identifier corresponding to the role 204, and the long-term security credentials associated with the user record 214. The access management system 118 provides the temporary security credentials in response to the request. The temporary security credentials are also encrypted to limit unauthorized access and use.

At 408, the compute service manager 112 generates and provides an execution plan to the execution platform 114 that specifies data to be processed and actions to be performed. The execution plan also identifies the target endpoint 304 and the temporary security credentials to be used to authenticate with the web API management system 120. The temporary security credentials included in the execution plan are also encrypted to ensure secure communication. In generating the execution plan, external functions (e.g., scalar functions, table functions, or stored procedures) may be converted into specification and description language (SDL) nodes along with the target endpoint 304 URL and other parameters. The execution platform 114 generates a query plan based on the execution plan to extract the data consumed, and as needed, build columns that are sharded in sub-columns.

At 410, the execution platform 114 executes the query plan by sending one or more requests (e.g., HTTP requests) to the web API management system 120. The execution platform 114 can utilize Transport Layer Security (TLS) protocol in communicating the request to the web API management system 120. Each request can comprise a collection of input rows as well as other metadata for performing a web call to the remote software component 108. Data can be passed as a combination of headers and message body, for example, in JSON, Apache Arrow, or XML format. Rows may be batched into requests to reduce the network overhead of each remote procedure call. Batching can be based on user-specified maximum batch size (e.g., included in the function definition), a maximum payload size allowed by the web API management system 120, or a maximum batch size (e.g., bytes or rows) allowed by the execution platform 114.

Requests are electronically signed and authenticated using the temporary security credentials. At 412, the web API management system 120 works in conjunction with the access management system 118 to authenticate each received request and verifies that the role 204 has appropriate permissions to make web calls to the remote software component 108 corresponding to the endpoint 304. If so, the web API management system 120 processes the requests by making one or more web calls, at 414, to the remote software component 108, via an API to the remote software component 108 provided by the remote computing environment 106, to invoke the external functionality with respect to the set of input data. The remote software component 108 communicates result data back to the web API management system 120 and the web API management system 120 communicates a response back to the execution platform 114, at 416. The result data can comprise JSON, Apache Arrow, or XML encoded data.

The execution platform 114 receives the response from the web API management system 120 and the execution platform 114 parses the response to extract the result data. The result data extracted by the execution platform 114 can comprise JSON, Apache Arrow, or XML encoded data. The execution platform 114 processes the result data according to the query plan. The processing of the result data can include storing the result data and/or performing one or more actions with respect to the result data.

In some embodiments, as part of executing the query plan, the execution platform 114 may pass data to the web API management system 120 by writing data to a first temporary data store that is commonly accessible by the network-based data warehouse system 102, the cloud computing service platform 104, and the remote computing environment 106. The data store may be provided by the cloud computing service platform 104 (e.g., AWS S3®). In these embodiments, the execution platform 114 sends a request to the web API management system 120 comprising an electronically signed URL corresponding to the data store and a manifest. The remote software component 108 reads data from the first temporary data store, executes the external functionality on the data, writes the result data to a second temporary data store where it can be read by the execution platform 114, and sends a response back to the web API management system 120.

A process executed by the execution platform 114 cleans up the temporary data stores when a query is finished or if a query fails. Data is server-side encrypted, using a derived key specific to each query. The key may be sent in HTTP request over TLS and is used by the remote software component 108 when reading data from the temporary data stores.

In some embodiments, the web API management system 120 applies a hard timeout that imposes a time limit (e.g., 30 seconds) for incoming requests. This may be problematic for requests that need longer than the time limit to execute such as external table functions. To support these scenarios, the execution platform 114 may, in some embodiments, use an asynchronous model where a single logical request is implemented as a state machine with the following states: 1) begin request; 2) poll status; and 3) read results. In this manner, after beginning a request, the execution platform 114 may proceed to poll the web API management system 120 for a status of the request and continue to do so until the result data is ready. in some embodiments, the execution platform 114 utilizes a webhook-style callback mechanism to address the hard timeout imposed by the web API management system 120.

In some instances, the temporary credentials can expire during a web call to the remote software component 108 or while waiting for the response from the web API management system 120. In these instances, the execution platform 114 can work in conjunction with the compute service manager 112 to refresh the temporary security credentials and upon refreshing the temporary security credentials, communicate additional requests to the web endpoint 304.

Figure 5:
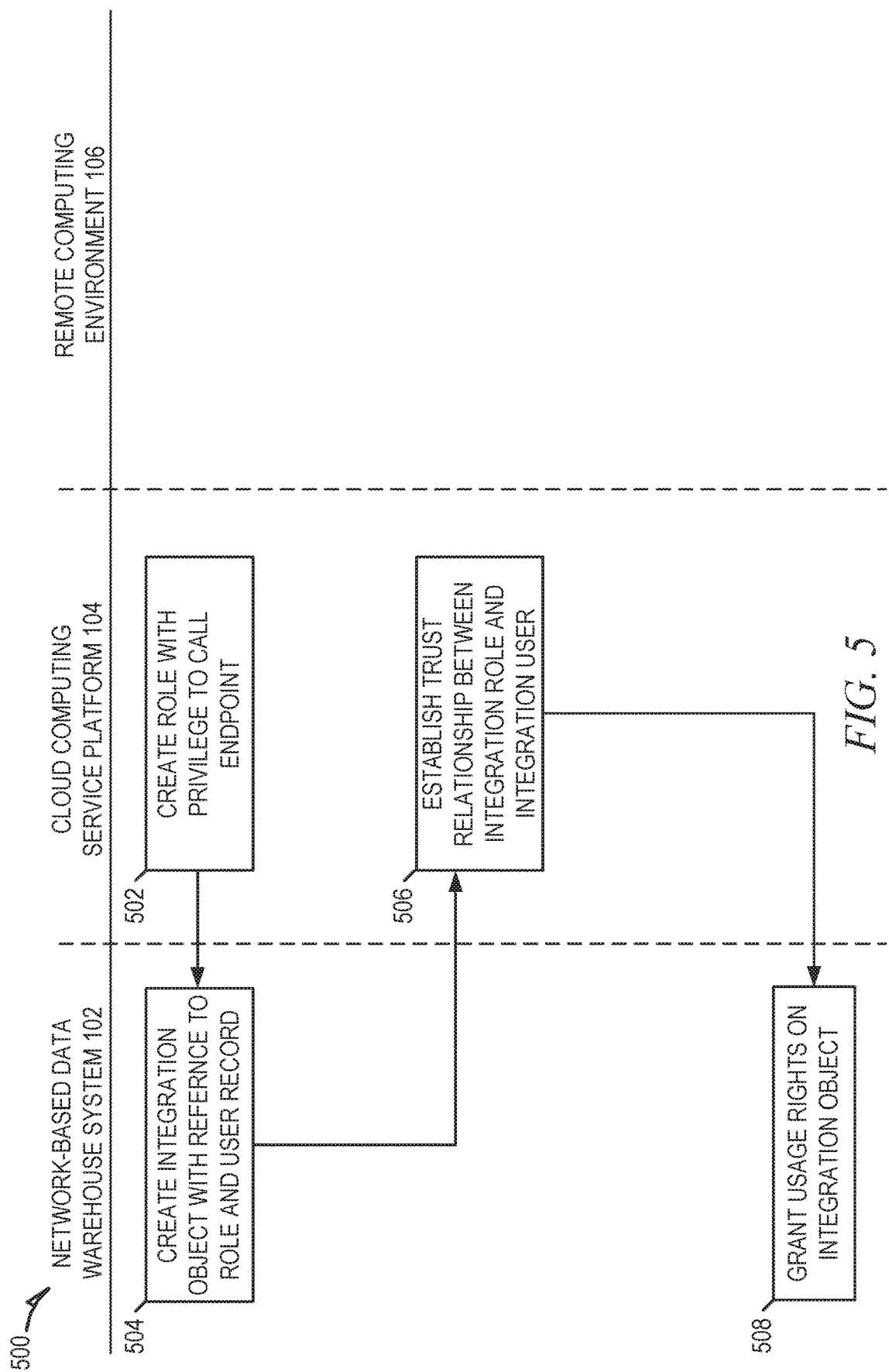
FIG. 5 is an interaction diagram illustrating interactions between components in the computing environment in creating of an integration object, in accordance with some embodiments of the present disclosure.

FIG. 5 is an interaction diagram illustrating interactions between the network-based data warehouse system 102, the cloud computing service platform 104, and the remote computing environment 106 in performing a method 500 for creating of an integration object (e.g., the integration object 200), in accordance with some embodiments of the present disclosure.

At operation 502, the cloud computing service platform 104 creates the role 204 with permission to call the endpoint 304 corresponding to the remote software component 108. The cloud computing service platform 104 creates the role 204 based on input received from the computing device 203 operated by the administrative user 202. For example, the administrative user 202 can utilize a user interface provided to computing device 203 by the cloud computing service platform 104 to provide appropriate input to cause the access management system 118 to create the role 204. The cloud computing service platform 104 assigns a resource identifier to the role 204 once the role 204 has been generated, and in an out-of-band communication the administrative user 202 communicates the resource identifier to the administrative user 206 of the network-based data warehouse system 102.

At operation 504, the compute service manager 112 creates the integration object 200 in the database 116 based on input provided by the administrative user 206 (e.g., via a UI provided to computing device 207 by the network-based data warehouse system 102). The input provided by the administrative user 206 includes the resource identifier associated with the role 204 and data defining a scheme for allowing/denying web calls based on target URLs. The integration object 200 generated by the compute service manager 112 includes: the reference 210 to the resource identifier associated with the role 204, the reference 212 to a resource identifier associated with the user record 214; and the data defining the scheme. In some embodiments, the integration object 200 may further comprise a reference to an external ID string generated by the compute service manager 112.

The administrative user 206 extracts the resource identifier of the user record 214 and, in some embodiments, the external ID string included in the integration object 200 and communicates the resource identifier of the user record 214 and the external ID string to the administrative user 202 in an out-of-band communication.

At operation 506, the cloud computing service platform 104 establishes a trust relationship between the role 204 and the user record 214 based on input from the administrative user 202 including the resource identifier of the user record 214 and, in some embodiments, the external ID string. The cloud computing service platform 104 establishes the trust relationship to enable a user corresponding to the user record 214 to assume the role 204 and send web calls to the remote software component 108 via the web API management system 120. As part of establishing the trust relationship, the role 204 is updated to include a reference 216 to the user record 214 and the external ID string, in some embodiments.

At operation 508, the compute service manager 112 grants usage rights to the integration object 200 to one or more users associated with the administrative user 206 based on input provided by the administrative user 206 via the UI provided to computing device 207.

Figure 6:
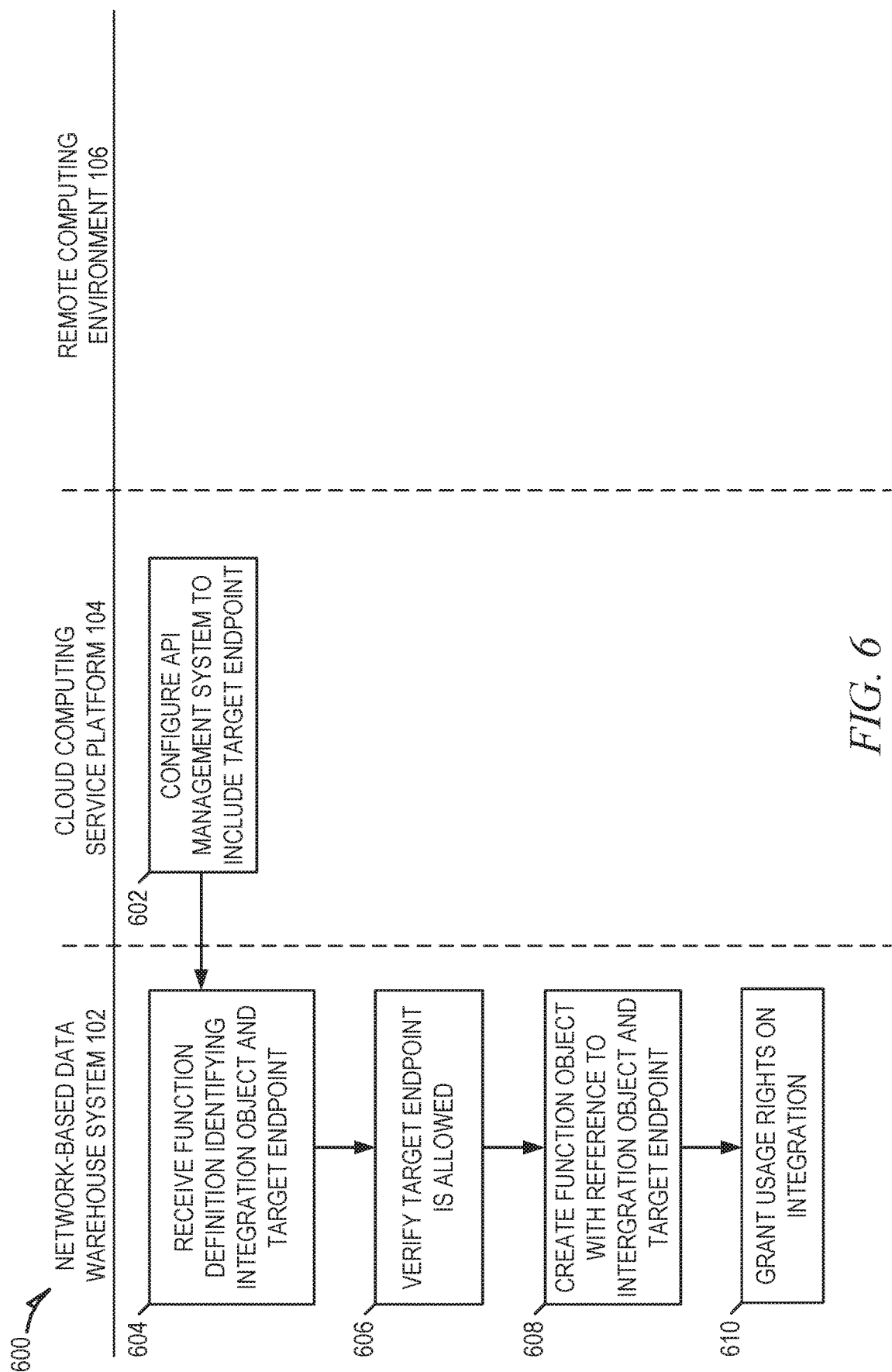
FIG. 6 is an interaction diagram illustrating interactions between components in the computing environment in creating a function object, in accordance with some embodiments of the present disclosure.

FIG. 6 is an interaction diagram illustrating interactions between network-based data warehouse system 102, the cloud computing service platform 104, the remote computing environment 106 in creating the function object 300, in accordance with some embodiments of the present disclosure. At operation 602, the web API management system 120 is configured by the function author 306 to include the target endpoint 304 corresponding to the remote software component 108. The function author 306 can configure the web API management system 120 using a UI provided to computing device 307 by the cloud computing service platform 104.

At operation 604, the compute service manager 112 receives, from the computing device 307, a function definition identifying the integration object 200 and the target endpoint 304 (e.g., a URL). The function definition can be specified by the function author 306 using a UI provided to the computing device 307 by the network-based data warehouse system 102.

At operation 606, the compute service manager 112 verifies whether the target endpoint is allowed by the scheme defining allowable/restricted URLs. If it is not allowed, the compute service manager 112 rejects the function definition. Otherwise, the compute service manager 112, at operation 608, creates the function object 300 in the database 116 that defines a function that can be used in a query (e.g., SQL query) to invoke the external functionality provided by the remote software component 108. The function object 300 comprises the reference 308 (e.g., a pointer) to the integration object 200 and the reference 314(e.g., a pointer) to the target endpoint 304. At operation 610, the compute service manager 112 grants usage rights to the function object 300 to one or more users associated with the function author 306 based on input provided by the function author 306 via the UI provided to computing device 307.

Figure 7:
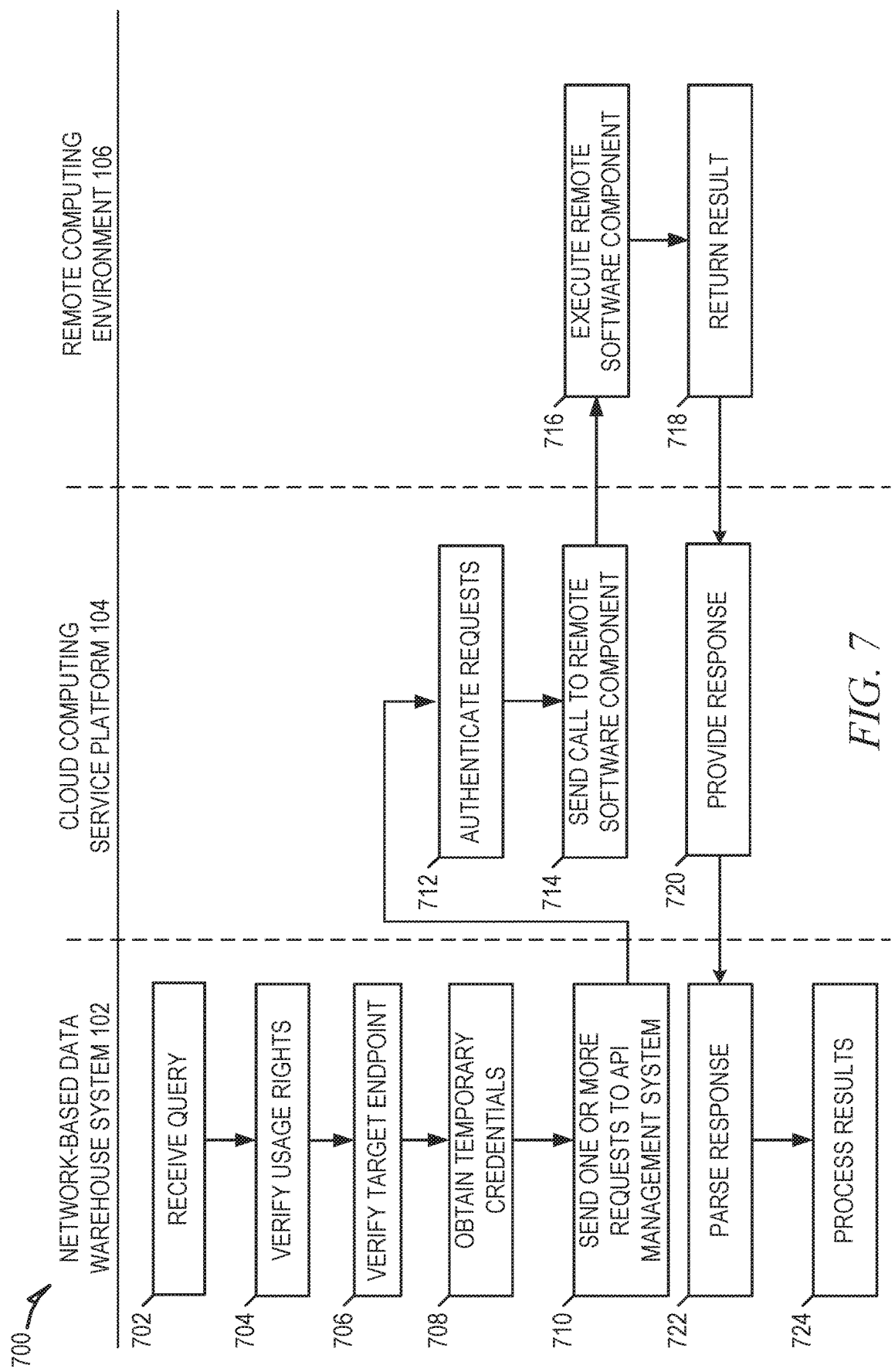
FIG. 7 is an interaction diagram illustrating interactions between components in the computing environment in invoking external functionality provided by the remote software component, in accordance with some embodiments of the present disclosure.

FIG. 7 is an interaction diagram illustrating interactions between components of network-based data warehouse system 102, the cloud computing service platform 104, and the remote computing environment 106 in invoking external functionality provided by remote software component 108, in accordance with some embodiments of the present disclosure.

At operation 702, the network-based data warehouse system 102 receives a query from the computing device 401 operated by function caller 400. The query comprises an invocation of the function defined by the function object 300 and indicates a set of input data for the function. In response to receiving the query, the network-based data warehouse system 102 verifies, at operation 704, that the function caller 400 has appropriate usage rights to invoke the function. At operation 706, the network-based data warehouse system 102 verifies that the target endpoint of the function (e.g., endpoint 304) referenced in the query is allowed based on the scheme defining allowable/restricted URLs (e.g., the whitelist and/or blacklist).

If the function caller 400 has appropriate usage rights and the target endpoint is allowed, the compute service manager 112 obtains temporary security credentials for assuming the role 204, at operation 708. The temporary security credentials can be obtained by transmitting a request to the access management system 118 of the cloud computing service platform 104 for the temporary security credentials. The request can comprise or indicate the resource identifier corresponding to the user record 214, the resource identifier corresponding to the role 204, and the long-term security credentials associated with the user record 214.

At operation 710, the network-based data warehouse system 102 sends one or more requests (e.g., HTTP requests) to the web API management system 120 of the cloud computing service platform 104 (e.g., using TLS protocol). Each request can comprise a collection of input rows as well as other metadata for performing a web call to the remote software component 108.

The web API management system 120 works in conjunction with the access management system 118 of the cloud computing service platform 104 to authenticate each received request at operation 712. At operation 714, the web API management system 120 of the cloud computing service platform 104 processes the requests by sending one or more web calls to the remote software component 108, via an API to the remote software component 108 provided by the remote computing environment 106, to invoke the external functionality with respect to the set of input data.

At operation 716, the remote computing environment 106 executes the remote software component 108 with the input data provided as input and in doing so, the remote computing environment 106 generates result data (e.g., in JSON, Apache Arrow, or XML format). The remote computing environment 106 communicates result data back to the web API management system 120, at operation 718. At operation 720, the web API management system 120 communicates a response back to the execution platform 114 that comprises the result data (e.g., in JSON, Apache Arrow, or XML format).

The network-based data warehouse system 102 parses the response, at operation 722, to extract the result data (e.g., in JSON, Apache Arrow, or XML format). At operation 724, the execution platform 114 processes the result data (e.g., by storing the result data and/or performing one or more actions with respect to the result data).

Figure 8:
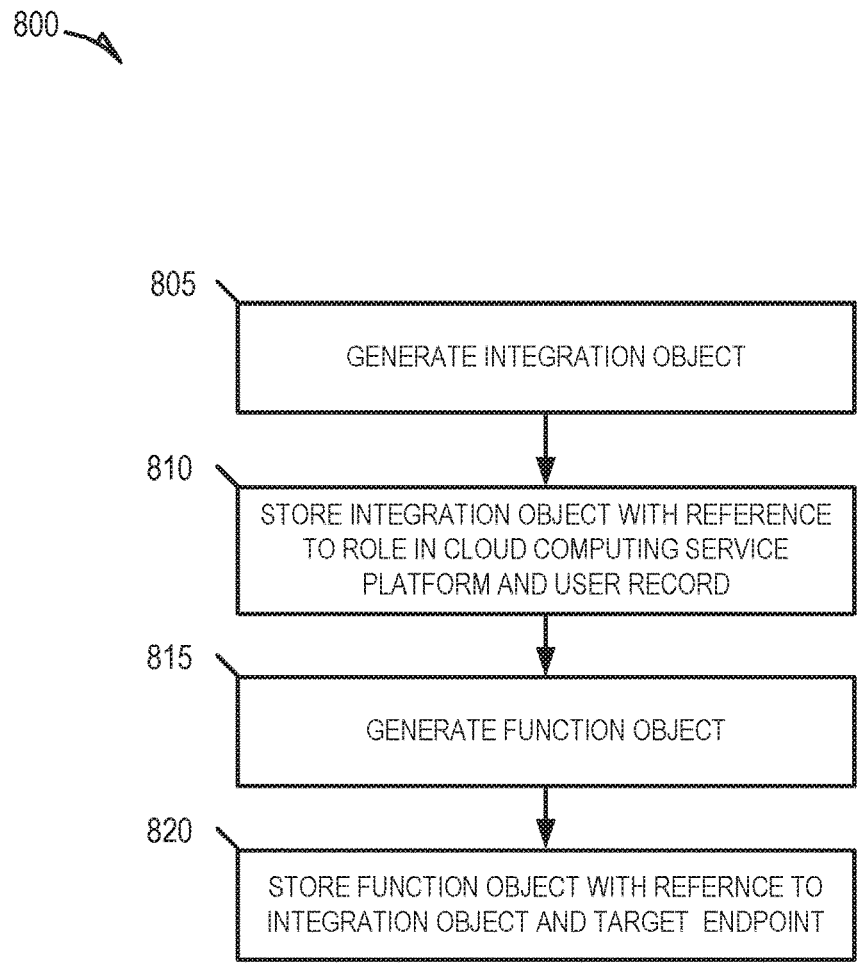
FIG. 8 is a flow diagram illustrating operations of the network-based data warehouse system in performing a method for enabling a network-based data warehouse to invoke external functionality provided by the remote software component, in accordance with some embodiments of the present disclosure.

FIG. 8 is a flow diagram illustrating operations of the network-based data warehouse system 102 in performing a method 800 for enabling a network-based data warehouse system 102 to invoke an external function provided by the remote software component 108, in accordance with some embodiments of the present disclosure. The method 800 may be embodied in computer-readable instructions for execution by a hardware component (e.g., a processor) such that the operations of the method 800 may be performed by components of network-based data warehouse system 102. Accordingly, the method 800 is described below, by way of example with reference thereto. However, it shall be appreciated that the method 800 may be deployed on various other hardware configurations and is not intended to be limited to deployment within the network-based data warehouse system 102.

At operation 805, the compute service manager 112 generates an integration object (e.g., integration object 200) based on first input received from a first computing device (e.g., computing device 207) corresponding to a first user (e.g., user 206) of the network-based data warehouse system 102. The first user can, for example, provide the input using a UI provided to the computing device by the network-based data warehouse system 102. The input comprises a first resource identifier corresponding to a role (e.g., role 204) in the cloud computing service platform 104 and a schemed defining allowable/restricted URLs to which web calls may be sent (e.g., a whitelist and/or blacklist of URLs). The first resource identifier can be communicated to the first user by an administrative user of the cloud computing service platform 104 (e.g., the administrative user that created the role).

As part of generating the integration object, the compute service manager 112 identifies a second resource identifier corresponding to a user record (e.g., user record 214) maintained by the access management system 110 of the network-based data warehouse system 102 to assign to the integration. In some embodiments, the compute service manager 112 also generates an external ID string that can be used to establish a trust relationship between the role in the cloud computing services platform 104 and the user record. Further, the compute service manager 112 can also grant usage rights to the integration to one or more users (e.g., users specified by the administrative user of the network-based data warehouse).

The integration object comprises: a reference to the first resource identifier corresponding to the role in the cloud computing service platform 104, a reference to the second resource identifier corresponding to a user record maintained by the network-based data warehouse system 102, data defining a scheme for allowing/denying web calls based on target URLs, and, in some embodiments, a reference to the external ID string. The administrative user of the network-based data warehouse can communicate the second resource identifier and the external ID string to the administrative user of the cloud computing service platform 104 and the administrative user of the cloud computing service platform can in turn create the trust relationship between the role and the user record.

At operation 810, the compute service manager 112 stores the integration object in the database 116 along with a reference to the user record maintained by the access management system 110 and a reference to the role maintained by the cloud computing services platform 104. For example, the compute service manager 112 can store the integration object with a first pointer corresponding to the user record and a second pointer corresponding to the role.

At operation 815, the compute service manager 112 generates a function object (e.g., function object 300) based on second input received from a second computing device (e.g., computing device 203) corresponding to a second user (e.g., function author 306) of the data warehouse system 102. The function object comprises a reference to the integration object and a reference to a target endpoint in the web API management system 120 (e.g., target endpoint 304) corresponding to the remote software component 108. The second input can identify the target endpoint and the integration object. For example, the second input can include a URL corresponding to the target endpoint and a resource identifier corresponding to the integration object. Prior to generating the function object, the compute service manager 112 verifies that the target endpoint is allowed by comparing the target endpoint to the scheme that defines allowable/restricted URLs.

At operation 820, the compute service manager 112 stores the function object with a reference to the integration object and reference to the target endpoint in the web API management system 120. For example, the compute service manager 112 can store the function object with a first pointer corresponding to the integration object and a second pointer corresponding to the target endpoint in the web API management system 120.

Figure 9:
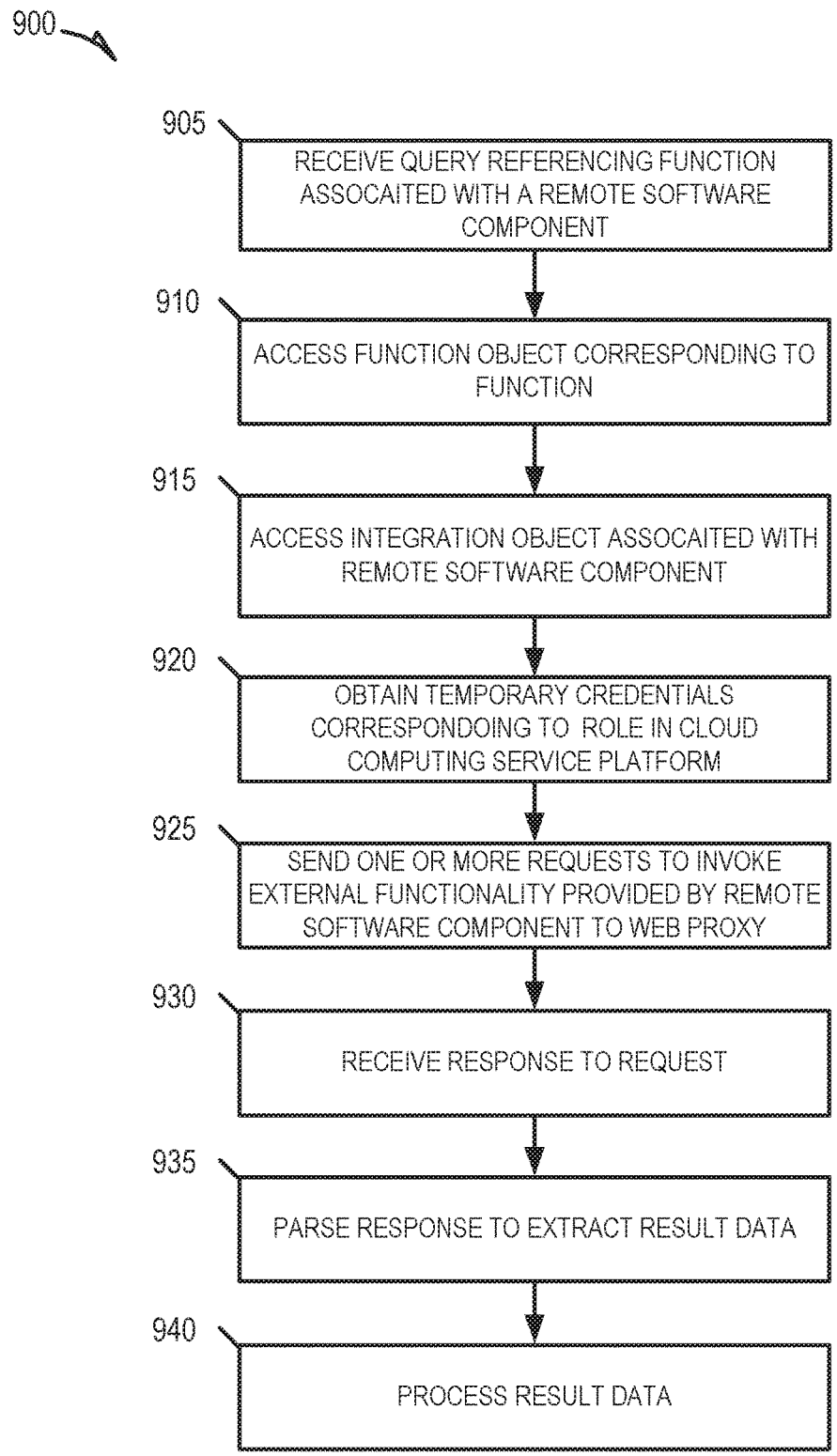
FIGS. 9-11 are flow diagrams illustrating operations of the network-based data warehouse in performing a method for invoking external functionality provided by the remote software component, in accordance with some embodiments of the present disclosure.
Figure 10:
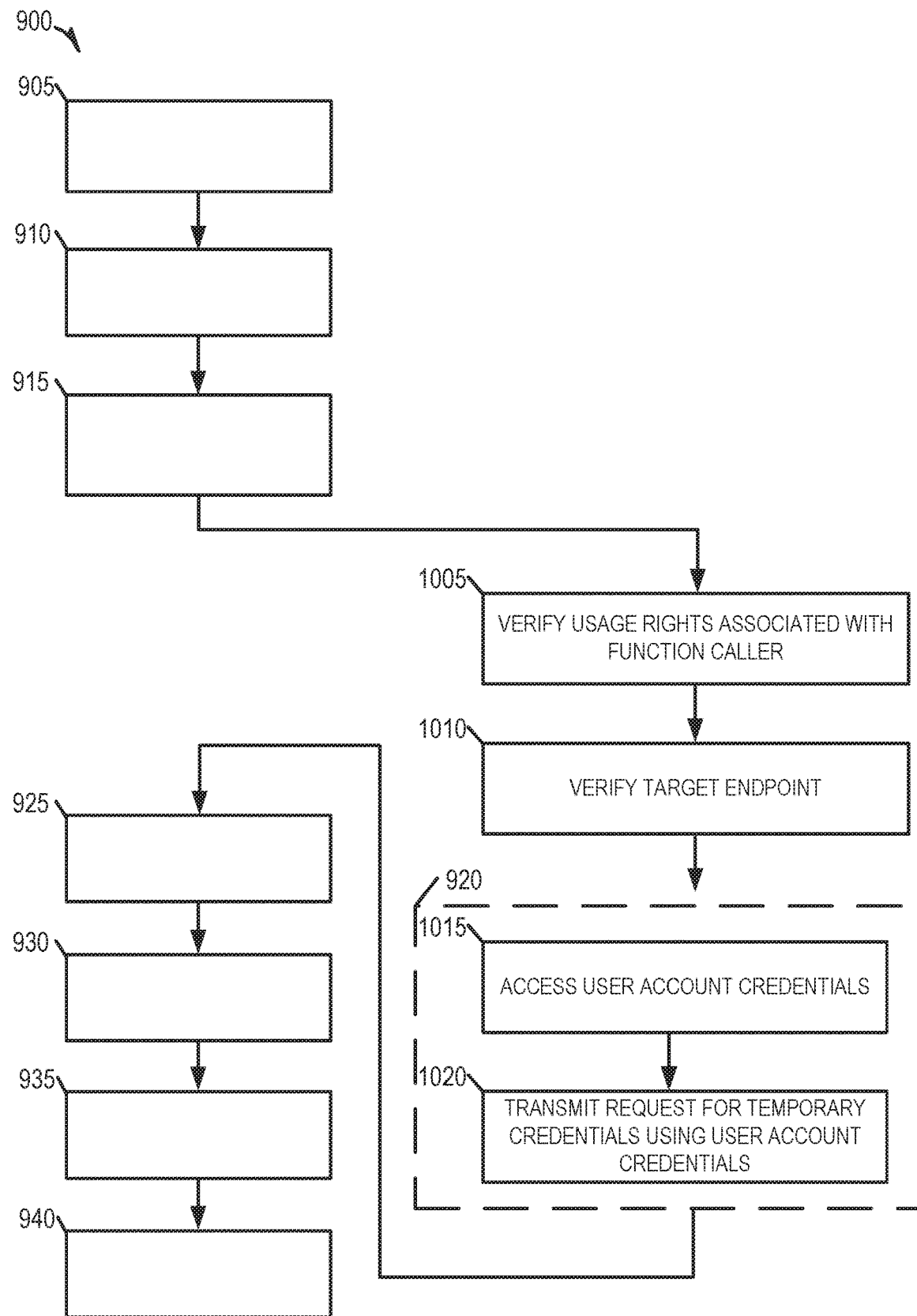
Figure 11:
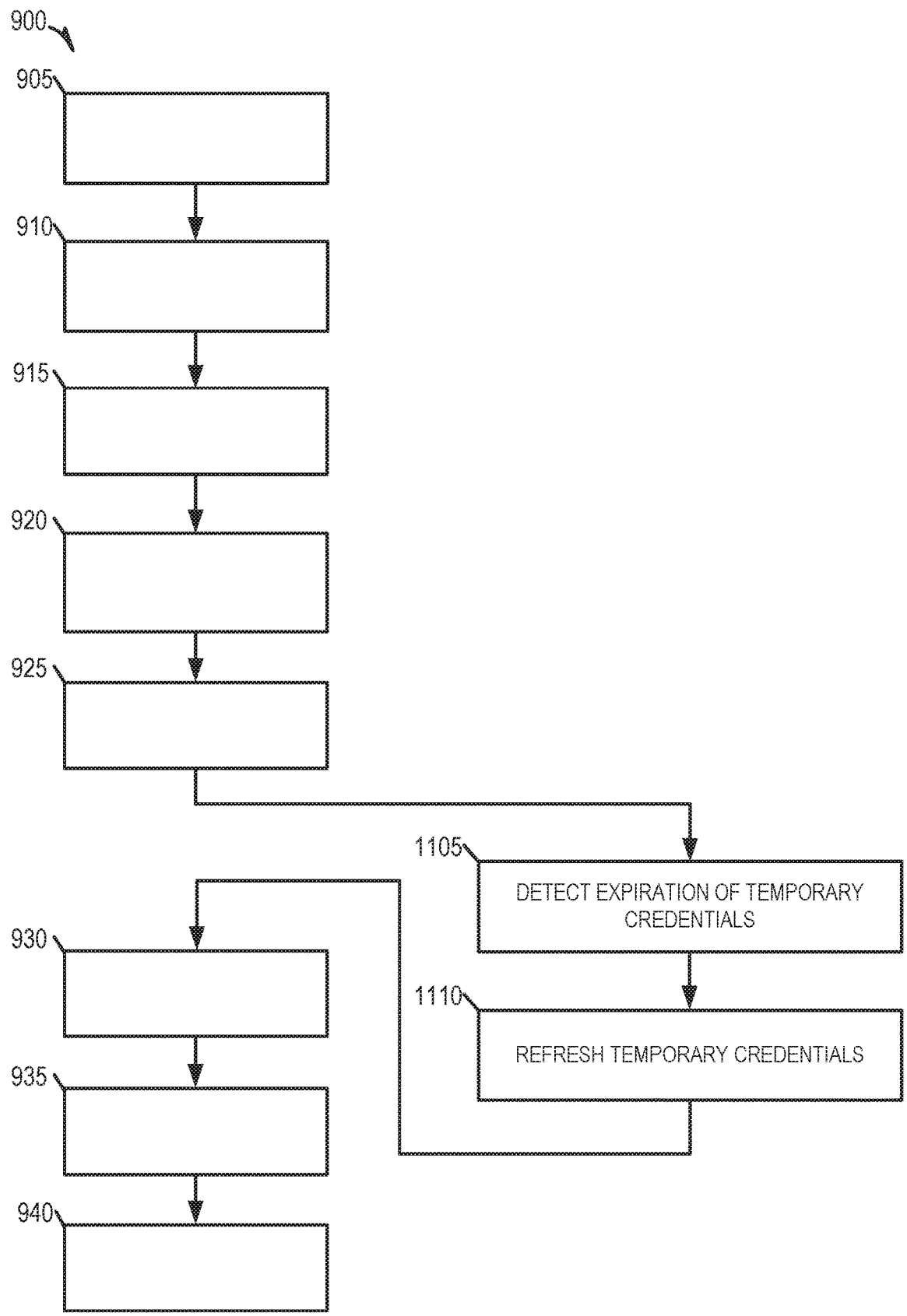

FIGS. 9-11 are flow diagrams illustrating operations of the network-based data warehouse system 102 in performing a method 900 for invoking external functionality provided by remote software component 108, in accordance with some embodiments of the present disclosure. The method 900 may be embodied in computer-readable instructions for execution by a hardware component (e.g., a processor) such that the operations of the method 900 may be performed by components of network-based data warehouse system 102. Accordingly, the method 900 is described below, by way of example with reference thereto. However, it shall be appreciated that the method 900 may be deployed on various other hardware configurations and is not intended to be limited to deployment within the network-based data warehouse system 102.

In some embodiments, the method 900 is performed subsequent to the method 800 where the network-based data warehouse system 102 enables invocation of the external functionality by generating and storing the integration object and function object. Consistent with these embodiments, the method 900 includes the operations 805, 810, 815, and 820 of the method 800.

At operation 905, the compute service manager 112 receives a query from a computing device of a third user (e.g., function caller 400) that comprises a reference to a function associated with the remote software component 108. As an example, the remote software component 108 may comprise a scalar function, a table function, or a stored procedure. The query further indicates a set of input data for the function.

At operation 910, the compute service manager 112 accesses a function object (e.g., the function object 300) corresponding to the function based on the reference to the function included in the query. The function object is stored with an association e.g., a pointer) to an integration object associated with the remote software component 108, and the compute service manager 112 uses this information in the function object to identify the integration object.

At operation 915, the compute service manager 112 accesses the integration object (e.g., integration object 200) from the database 116 based on the association with the function object. The integration object includes a reference to a user record maintained by the access management system 110 and a reference to a role (e.g., role 204) maintained by the access management system 118 of the cloud computing services platform 104.

At operation 920, the compute service manager 112 obtains temporary security credentials to be used in authenticating with the web API management system 120 to assume the role in the cloud computing service platform 104. The temporary security credentials expire after a time limit is reached (e.g., 1 hour) and are limited in scope for use specifically in invoking external functionality provided by the remote software component 108.

At operation 925, the execution platform 114 sends one or more requests (e.g., one or more HTTP requests) to the web API management system 120 of the cloud computing service platform 104 to invoke the external functionality provided by the remote software component 108. The one or more requests comprises input data and a reference to the target endpoint corresponding to the remote software component 108 and are electronically signed using the temporary security credentials. The one or more requests are authenticated by the access management system 118 and cause the web API management system 120 to invoke the external functionality provided by the remote software component 108. For example, the requests may cause the web API management system 120 to send one or more web calls to the remote software component 108 (e.g., via an API provided by the remote computing environment 106). The remote software component 108, in turn, executes a scalar function, tabular function, or procedure and generates result data based thereon. The remote software component 108 communicates the result data back to the web API management system 120 (e.g., in one or more HTTP responses). The web API management system 120 communicates a response to the request to the execution platform 114. The result data can comprise JSON, Apache Arrow, or XML encoded data.

At operation 930, the execution platform 114 receives the response to the request from the compute service manager 112 and the execution platform 114 parses the response to extract the result data, at operation 935. The result data extracted by the execution platform 114 can comprise JSON, Apache Arrow, or XML encoded data.

At operation 940, the execution platform 114 processes the result data. The processing of the result data can include storing the result data and/or performing one or more actions with respect to the result data.

As shown in FIG. 10, the method 900 may, in some embodiments, further include operations 1005, 1010, 1015, and 1020. Consistent with these embodiments, the operations 1005 and 1010 are performed subsequent to operations 915 wherein the compute service manager 112 accesses the integration object. At operation 1005, the compute service manager 112 verifies that the third user (e.g., the function caller 400) has usage rights to utilize the integration based on usage rights indicated by the integration object. At operation 1010, the compute service manager 112 verifies that the target endpoint included in the query is allowed based on a comparison of the target endpoint with the scheme that defines allowable/restricted URLs indicated by the integration object.

Consistent with these embodiments, the operations 1015 and 1020 may be performed as part of operation 920 (e.g., as sub-operation or a sub-routine), where the compute service manager 112 obtains temporary security credentials to assume the cloud computing service platform 104 role.

At operation 1015, the compute service manager 112 accesses long-term security credentials associated with the user record in the data cloud warehouse system 102. The long-term security credentials can be stored in an encrypted format in the database and/or a cache memory component of the compute service manager 112.

At operation 1020, the compute service manager 112 transmits a request to the access management system 118 of the cloud computing service platform 104 for the temporary security credentials. The request can comprise or indicate the first resource identifier corresponding to the user record in the data warehouse system 102, the second resource identifier corresponding to the cloud computing services platform role, and the long-term security credentials associated with the user record. The access management system 118 of the cloud computing service platform 104 provides the temporary security credentials in response to the request.

As shown in FIG. 11, the method 900 may, in some embodiments, include operations 1105 and 1110. Consistent with these embodiments, the operations 1105 and 1110 may be performed prior to operation 930 where the execution platform 114 receives the response from the web API management system 120. At operation 1105, the execution platform 114 detects an expiration of the temporary security credentials. For example, the execution platform 114 can detect the expiration of the temporary security credentials based on determining the expiration time limit has been reached or based on a timeout message received from the cloud computing service platform 104. In some embodiments, the execution platform 114 may poll the web API management system 120 for a status of the request and detect the expiration of the temporary credentials based on a response thereto.

At operation 1110, the compute service manager 112 refreshes the temporary security credentials to enable the execution platform 114 to continue assuming the role. For example, the compute service manager 112 can refresh the temporary security credentials by sending an additional request to the access management system 118 of the cloud computing service platform 104. Upon refreshing the security credentials, the compute service manager 112 may prompt the execution platform 114 to send one or more additional requests to the web API management system 120 to invoke the external functionality provided by the remote software component 108. In some instances, the compute service manager 112 may refresh the temporary security credentials to ensure that the web API management system 120 is able to communicate the response back to the execution platform 114.

Figure 12:
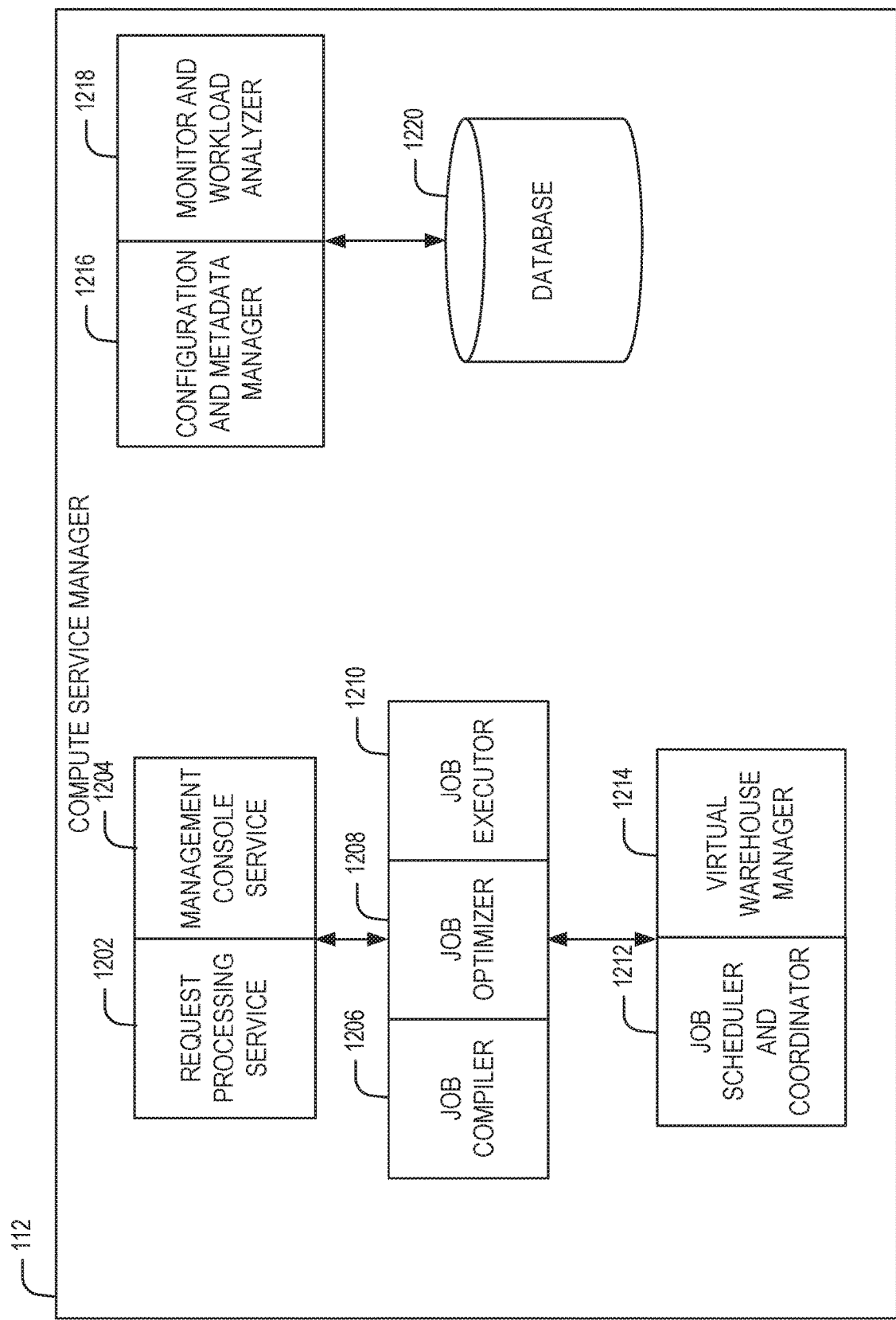
FIG. 12 is a block diagram illustrating components of a compute service manager, in accordance with some embodiments of the present disclosure.

FIG. 12 is a block diagram illustrating components of the compute service manager 112, in accordance with some embodiments of the present disclosure. As shown in FIG. 12, 1 request processing service 1202 manages received data storage requests and data retrieval requests (e.g., jobs to be performed on database data). For example, the request processing service 1202 may determine the data necessary to process a received query (e.g., a data storage request or data retrieval request). The data may be stored in a cache within the execution platform 114 or in a data storage device in cloud computing service platform 104. A management console service 1204 supports access to various systems and processes by administrators and other system managers. Additionally, the management console service 1204 may receive a request to execute a job and monitor the workload on the system.

The compute service manager 112 also includes a job compiler 1206, a job optimizer 1208 and a job executor 1210. The job compiler 1206 parses a job into multiple discrete tasks and generates the execution code for each of the multiple discrete tasks. The job optimizer 1208 determines the best method to execute the multiple discrete tasks based on the data that needs to be processed. The job optimizer 1208 also handles various data pruning operations and other data optimization techniques to improve the speed and efficiency of executing the job. The job executor 1210 executes the execution code for jobs received from a queue or determined by the compute service manager 112.

A job scheduler and coordinator 1212 sends received jobs to the appropriate services or systems for compilation, optimization, and dispatch to the execution platform 114. For example, jobs may be prioritized and processed in that prioritized order. In an embodiment, the job scheduler and coordinator 1212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 1212 identifies or assigns particular nodes in the execution platform 114 to process particular tasks. A virtual warehouse manager 1214 manages the operation of multiple virtual warehouses implemented in the execution platform 114. As discussed below, each virtual warehouse includes multiple execution nodes that each include a cache and a processor.

Additionally, the compute service manager 112 includes a configuration and metadata manager 1216, which manages the information related to the data stored in the remote data storage devices and in the local caches (i.e., the caches in execution platform 114). The configuration and metadata manager 1216 uses the metadata to determine which data micro-partitions need to be accessed to retrieve data for processing a particular task or job. A monitor and workload analyzer 1218 oversee processes performed by the compute service manager 112 and manages the distribution of tasks (e.g., workload) across the virtual warehouses and execution nodes in the execution platform 114. The monitor and workload analyzer 1218 also redistribute tasks, as needed, based on changing workloads throughout the data. warehouse 102 and may further redistribute tasks based on a user (e.g., "external") query workload that may also be processed by the execution platform 114. The configuration and metadata manager 1216 and the monitor and workload analyzer 1218 are coupled to a data storage device 1220. Data storage device 1220 in FIG. 12 represent any data storage device within the data warehouse 102. For example, data storage device 1220 may represent caches in execution platform 114, storage devices in cloud computing service platform 104, or any other storage device.

Figure 13:
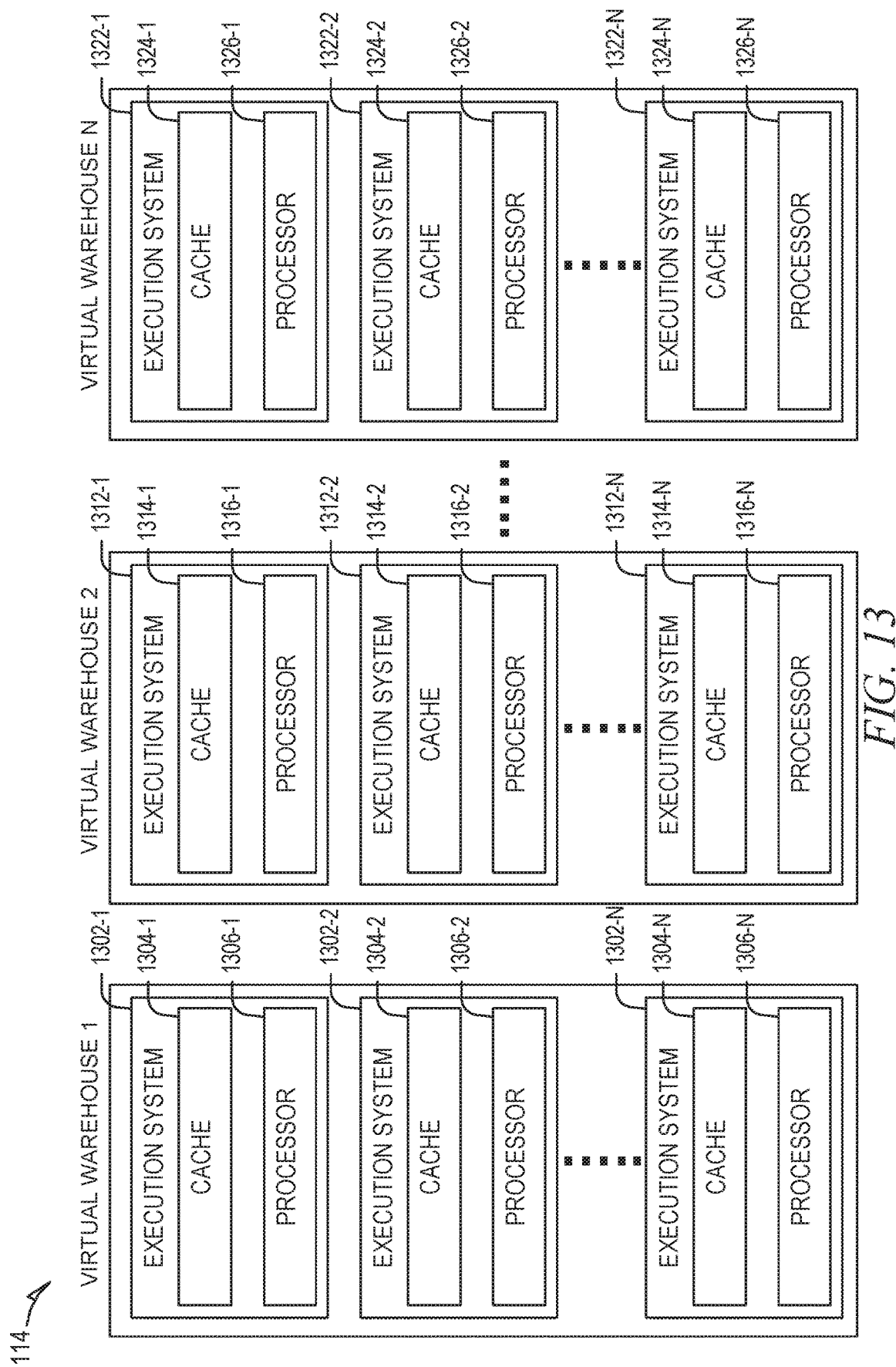
FIG. 13 is a block diagram illustrating components of an execution platform, in accordance with some embodiments of the present disclosure.

FIG. 13 is a block diagram illustrating components of the execution platform 114, in accordance with some embodiments of the present disclosure. As shown in FIG. 13, execution platform 114 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 114 can add new virtual warehouses and drop existing virtual warehouses in real-time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing service platform 104).

Although each virtual warehouse shown in FIG. 13 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing service platform 104. Similarly, each of the execution nodes shown in FIG. 13 can access data from any of the data storage devices 124-1 to 124-n. In some embodiments, a particular virtual warehouse or a particular execution node may be temporarily assigned to a specific data storage device, but the virtual warehouse or execution node may later access data from any other data storage device.

In the example of FIG. 13, virtual warehouse 1 includes three execution nodes 1302-1, 1302-2, and 1302-n. Execution node 1302-1 includes a cache 1304-1 and a processor 1306-1. Execution node 1302-2 includes a cache 1304-2 and a processor 1306-2. Execution node 1302-n includes a cache 1304-n and a processor 1306-n. Each execution node 1302-1, 1302-2, and 1302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1312-1, 1312-2, and 1312-n. Execution node 1312-a includes a cache 1314-1 and a processor 1316-1. Execution node 1312-n includes a cache 1314-n and a processor 1316-n. Execution node 1312-n includes a cache 1314-n and a processor 1316-n. Additionally, virtual warehouse 3 includes three execution nodes 1322-1, 1322-2, and 1322-n. Execution node 1322-1 includes a cache 1324-1 and a processor 1326-1. Execution node 1322-2 includes a cache 1324-2 and a processor 1326-2. Execution node 1322-n includes a cache 1324-n and a processor 1326-n.

In some embodiments, the execution nodes shown in FIG. 13 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 13 each include one data cache and one processor, alternate embodiments may include execution nodes containing any number of processors and any number of caches. Additionally, the caches may vary in size among the different execution nodes. The caches shown in FIG. 13 store, in the local execution node, data that was retrieved from one or more data storage devices in cloud computing service platform 104. Thus, the caches reduce or eliminate the bottleneck problems occurring in platforms that consistently retrieve data from remote storage systems, instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the cloud computing service platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 13 as having multiple execution nodes. The multiple execution nodes associated with each virtual warehouse may be implemented using multiple computing systems at multiple geographic locations. For example, an instance of virtual warehouse 1 implements execution nodes 1302-1 and 1302-2 on one computing platform at a geographic location and implements execution node 1302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing service platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 14:
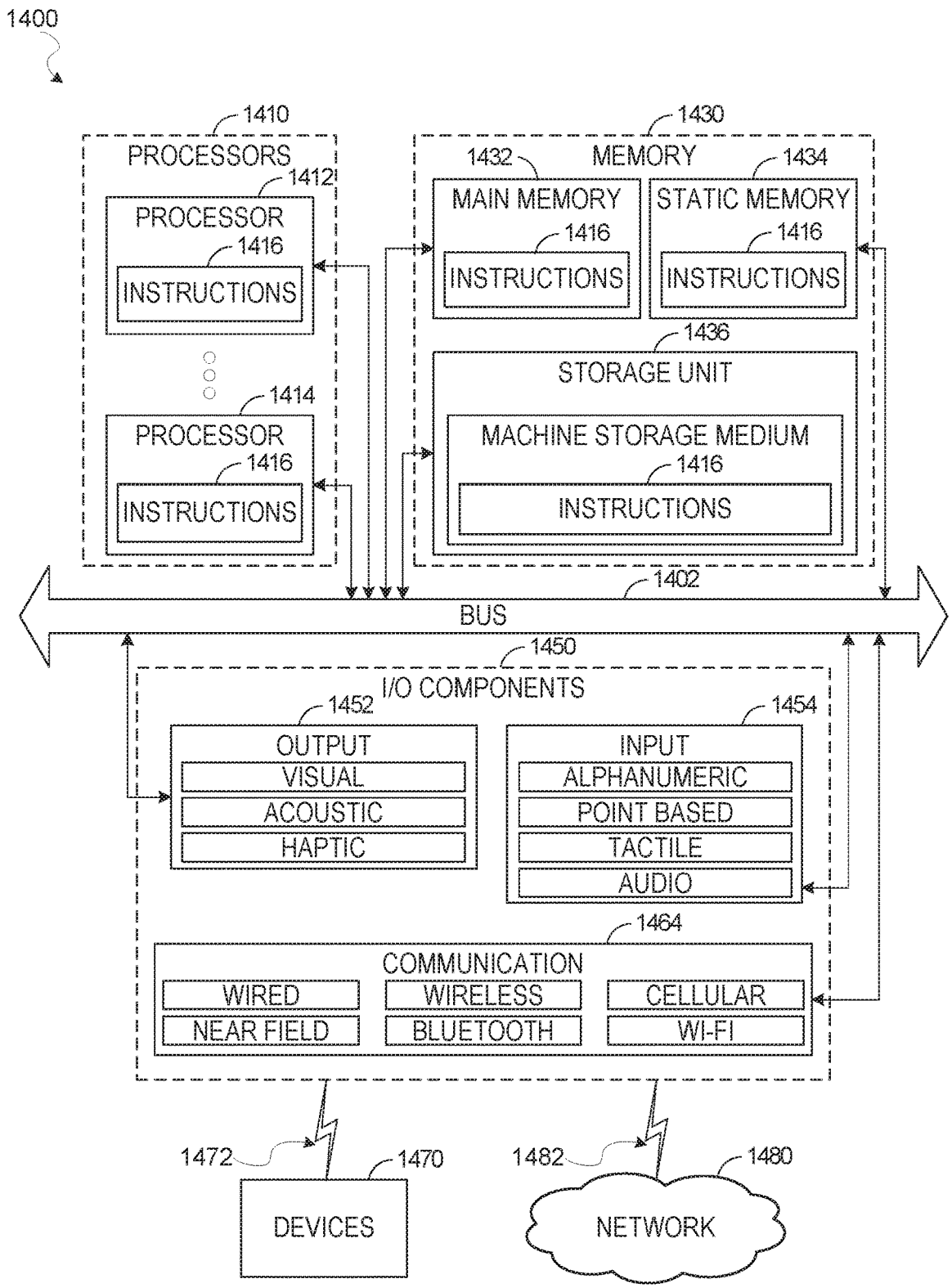
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute any one or more operations of any one or more of the methods 500, 600, 700, 800, or 900. As another example, the instructions 1416 may cause the machine 1400 to implemented portions of the data flows illustrated in any one or more of FIGS. 2-4. In this way, the instructions 1416 transform a general, non-programmed machine into a particular machine 1400 (e.g., the remote computing environment 106, the access management system 110, the compute service manager 112, the execution platform 114, the access management system 118, the web API management system 120, and the computing devices 203, 207, 307, and 401) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a. single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The devices 1470 may be another machine or any of a wide variety of peripheral devices (e.g., a peripheral device coupled via a universal serial bus (USB)). For example, as noted above, the machine 1400 may correspond to any one of the remote computing environment 106, the access management system 110, the compute service manager 112, the execution platform 114, the access management system 118, the web API management system 120, and the computing devices 203, 207, 307, and 401, and the devices 1470 may include any other of these systems and devices.

Executable Instructions and Machine Storage Medium

The various memories 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 500, 600, 700, 800, and 900 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a compute service manager comprising at least one hardware processor, the computer service manager to perform operations comprising: receiving, from a computing device, a query referencing a function associated with a remote software component; and obtaining, from a cloud computing service platform comprising at least one network-accessible storage device, temporary security credentials corresponding to a role with associated privileges to send calls to a web endpoint corresponding to the remote software component, the cloud computing service platform being independent from the compute service manager; an execution platform coupled to the compute service manager, the execution platform comprising a plurality of compute nodes, at least one of the compute nodes to perform operations comprising: sending, to a web API management system of the cloud computing service platform, a request that, when received by the web API management system, causes the web API management system to invoke external functionality provided by the remote software component at the web endpoint with respect to input data included in the request, the request being electronically signed using the temporary security credentials; receiving, from the web API management system, a response to the request, the response comprising result data comprising a result of invoking the external functionality; and processing the result data according to the query.

In Example 2 the subject matter of Example 1 optionally further comprises: in response to receiving the query, accessing, from a database, a function object associated with the remote software component, the function object identifying the web endpoint and an integration object associated with the remote software component; and accessing, from the database, the integration object, the integration object identifying the role at the cloud computing service platform.

In Example 3, the subject matter of any one of Examples 1 and 2 optionally further comprises: receiving a first resource identifier corresponding to the role at the cloud computing service platform; and generating an integration object in the database based on the first resource identifier.

In Example 4, the subject matter of any one of Examples 1-3 optionally further comprises: receiving a function definition identifying an integration object and the target endpoint; and generating a function object in the database based on the function definition.

Example 5 comprises the subject matter of any one of Examples 1-4, wherein an integration object optionally comprises a first resource identifier and a second resource identifier corresponding to a user record maintained by the network-based data warehouse system, the user record being associated, at the cloud computing service platform, with the role; the obtaining of the temporary security credentials optionally comprises: accessing, from the database, security credentials associated with the user record maintained by the network-based data warehouse system; and transmitting, to the cloud computing service platform, a request for the temporary security credentials, the request comprising the first and second resource identifiers and the security credentials associated with the user record maintained by the network-based data warehouse.

Example 6 comprises the subject matter of any one of Examples 1-5, wherein an integration object optionally further comprises data defining allowable uniform resource locators (URLs); the operations optionally comprise: in response to receiving the query, verifying a user associated with the query has usage rights associated with the integration object; and verifying that the web endpoint is permitted based on the scheme.

In Example 7, the subject matter of any one of Examples 1-6 optionally further comprises: detecting an expiration of the temporary security credentials prior to receiving the response from the web API management system; and in response to detecting the expiration of the temporary security credentials, refreshing the temporary security credentials.

Example 8 comprises the subject matter of any one of Examples 1-7 and the processing of the result data optionally comprises one or more of: storing the result data; and performing one or more actions on the result data In Example 9, the subject matter of any one of Examples 1-8 optionally further comprises parsing the response to extract the result data.

Example 10 comprises the subject matter of any one of Examples 1-9, wherein the request optionally comprises a hypertext transfer protocol (HTTP) request; the response optionally comprises an HTTP response; the input data optionally comprises JavaScript Object Notation (JSON) encoded data, Apache Arrow encoded data, or eXtensible Markup Language (XML) encoded data; and the result data optionally comprises JSON encoded data, Apache Arrow encoded data, or XML encoded data.

Example 11 comprises the subject matter of any one of Examples 1-10, wherein the wherein the external functionality provided by the remote software component optionally comprises one of: a scalar function, a table function, or a procedure.

Example 12 is a method comprising: receiving, at a network-based data warehouse comprising at least one computing system comprising one or more processors, a query referencing a function associated with a remote software component; obtaining, from a cloud computing service platform, temporary security credentials corresponding to a role with associated privileges to send calls to a web endpoint corresponding to the remote software component; sending, from the network-based data warehouse, to a web API management system of the cloud computing service platform, a request that, when received by the web API management system, causes the web API management system to invoke external functionality provided by the remote software component at the web endpoint with respect to input data included in the request, the request being electronically signed using the temporary security credentials; receiving, at the network-based data warehouse, from the web API management system, a response to the request, the response comprising result data comprising a result of invoking the external functionality; and processing, at the network-based data warehouse system, result data according to the query.

In Example 13 the subject matter of Example 12 optionally further comprises: in response to receiving the query, accessing, from a database, a function object associated with the remote software component, the function object identifying the web endpoint and an integration object associated with the remote software component; and accessing, from the database, the integration object, the integration object identifying the role at the cloud computing service platform.

In Example 14, the subject matter of any one of Examples 12 and 14 optionally further comprises: receiving a first resource identifier corresponding to the role at the cloud computing service platform; and generating an integration object in the database based on the first resource identifier.

In Example 15, the subject matter of any one of Examples 12-14 optionally further comprises receiving a function definition identifying an integration object and the target endpoint; and generating a function object in the database based on the function definition.

Example 16 comprises the subject matter of any one of Examples 12-15, wherein an integration object optionally comprises a first resource identifier and a second resource identifier corresponding to a user record maintained by the network-based data warehouse system, the user record being associated, at the cloud computing service platform, with the role; the obtaining of the temporary security credentials optionally comprises: accessing, from the database, security credentials associated with the user record maintained by the network-based data warehouse system; and transmitting, to the cloud computing service platform, a request for the temporary security credentials, the request comprising the first and second resource identifiers and the security credentials associated with the user record maintained by the network-based data warehouse.

Example 17 comprises the subject matter of any one of Examples 12-16, wherein an integration object optionally further comprises data defining allowable uniform resource locators (URLs); the operations optionally comprise: in response to receiving the query, verifying a user associated with the query has usage rights associated with the integration object; and verifying that the web endpoint is permitted based on the allowable URLs.

In Example 18, the subject matter of any one of Examples 12-17 optionally further comprises: detecting an expiration of the temporary security credentials prior to receiving the response from the web API management system; and in response to detecting the expiration of the temporary security credentials, refreshing the temporary security credentials.

In Example 19, the subject matter of any one of Examples 12-18 optionally further comprises parsing the response to extract the result data.

Example 20 is a computer-storage medium comprising instructions that, when executed by a processing device, configure the processing device to perform operations comprising: receiving, from a computing device, a query referencing a function associated with a remote software component; obtaining, from a cloud computing service platform, temporary security credentials corresponding to a role with associated privileges to send calls to a web endpoint corresponding to the remote software component; sending, to a web API management system of the cloud computing service platform, a request that, when received by the web API management system, causes the web API management system to invoke external functionality provided by the remote software component at the web endpoint with respect to input data included in the request, the request being electronically signed using the temporary security credentials; receiving, from the web API management system, a response to the request, the response comprising result data comprising a result of invoking the external functionality; and processing the result data according to the query.

The invention claimed is:
1. A system comprising:
one or more hardware processors; and
one or more memories storing instructions that cause the one or more hardware processors to perform operations comprising:

generating, in a database, a first data object comprising:
a first identifier corresponding to a role at a cloud computing service platform, and
a second identifier corresponding to a user record maintained by the system that is associated, at the cloud computing service platform, with the role; and
generating, in the database, a second data object comprising:
a third identifier corresponding to the first data object, and
a target endpoint corresponding to a remote software component.

2. The system of claim 1, wherein the operations further comprise:
receiving, from a computing device, a query referencing a function associated with the remote software component; and
causing functionality provided by the remote software component to be invoked using the first data object and the second data object.

3. The system of claim 2, wherein causing functionality provided by the remote software component to be invoked comprises:
sending, to a web application programming interface (API) management system of a cloud computing service platform, a request that causes the web API management system to invoke external functionality provided by the remote software component.

4. The system of claim 3, wherein the operations further comprise:
receiving, from the web API management system, a response to the request, the response comprising result data comprising a result of invoking the external functionality; and
processing the result data according to the query.

5. The system of claim 4, wherein:
the request comprises a hypertext transfer protocol (HTTP) request;
the response comprises an HTTP response; and
the result data comprises JSON encoded data, Apache Arrow encoded data, or XML encoded data.

6. The system of claim 3, the operations further comprise:
accessing, from a database, security credentials associated with a user record maintained by the system; and
obtaining, from the cloud computing service platform, security credentials corresponding to the role using the security credentials associated with the user record.

7. The system of claim 6, wherein the request includes security credentials corresponding to the role.

8. The system of claim 3, wherein the role at the cloud computing service platform has associated privileges to send calls to the endpoint.

9. The system of claim 2, wherein:
the first data object further comprises data defining allowable uniform resource locators (URLs);
the operations further comprise verifying that the target endpoint is permitted based on the allowable URLs.

10. The system of claim 1, wherein the remote software component provides external functionality, wherein the external functionality provided by the remote software component comprises one of: a scalar function, a table function, or a procedure.

11. A method comprising:
generating, by one or more hardware processors, a first data object in a database, the first database object comprising:
a first identifier corresponding to a role at a cloud computing service platform, and
a second identifier corresponding to a user record maintained by the system that is associated, at the cloud computing service platform, with the role; and
generating, by one or more hardware processors, a second data object in the database, the second data object comprising:
a third identifier corresponding to the first data object, and
a target endpoint corresponding to a remote software component.

12. The method of claim 11, further comprising:
receiving, from a computing device, a query referencing a function associated with the remote software component; and
causing functionality provided by the remote software component to be invoked using the first data object and the second data object.

13. The method of claim 12, wherein causing functionality provided by the remote software component to be invoked comprises:
sending, to a web application programming interface (API) management system of a cloud computing service platform, a request that causes the web API management system to invoke external functionality provided by the remote software component.

14. The method of claim 13, further comprising:
receiving, from the web API management system, a response to the request, the response comprising result data comprising a result of invoking the external functionality; and
processing the result data according to the query.

15. The method of claim 14, wherein:
the request comprises a hypertext transfer protocol (HTTP) request;
the response comprises an HTTP response; and
the result data comprises JSON encoded data, Apache Arrow encoded data, or XML encoded data.

16. The method of claim 13, further comprising:
accessing, from a database, security credentials associated with a user record; and
obtaining, from the cloud computing service platform, security credentials corresponding to the role using the security credentials associated with the user record.

17. The method of claim 16, wherein the request includes security credentials corresponding to the role.

18. The method of claim 13, wherein the role at the cloud computing service platform has associated privileges to send calls to the endpoint.

19. The method of claim 12, wherein:
the first data object further comprises data defining allowable uniform resource locators (URLs);
the method further comprises verifying that the target endpoint is permitted based on the allowable URLs.

20. The method of claim 11, wherein the remote software component provides external functionality, wherein the external functionality provided by the remote software component comprises one of:
a scalar function, a table function, or a procedure.

21. A computer-storage medium comprising instructions that, when executed by a processing device, configure the processing device to perform operations comprising:
generating, in a database, a first data object comprising:
a first identifier corresponding to a role at a cloud computing service platform, and
a second identifier corresponding to a user record that is associated, at the cloud computing service platform, with the role; and generating, in the database, a second data object comprising:
  a third identifier corresponding to the first data object, and
  a target endpoint corresponding to a remote software component.

22. The computer-storage medium of claim 21, wherein the operations comprising:
  receiving, from a computing device, a query referencing a function associated with the remote software component; and
  causing functionality provided by the remote software component to be invoked using the first data object and the second data object.

23. The computer-storage medium of claim 22, wherein causing functionality provided by the remote software component to be invoked comprises:
  sending, to a web application programming interface (API) management system of a cloud computing service platform, a request that causes the web API management system to invoke external functionality provided by the remote software component.

24. The computer-storage medium of claim 23, wherein the operations further comprise:
  receiving, from the web API management system, a response to the request, the response comprising result data comprising a result of invoking the external functionality; and
  processing the result data according to the query.

25. The computer-storage medium of claim 24, wherein:
  the request comprises a hypertext transfer protocol (HTTP) request;
  the response comprises an HTTP response; and
  the result data comprises JSON encoded data, Apache Arrow encoded data, or XML, encoded data.

26. The computer-storage medium of claim 23, further comprising:
  accessing, from a database, security credentials associated with a user record; and
  obtaining, from the cloud computing service platform, security credentials corresponding to the role using the security credentials associated with the user record.

27. The computer-storage medium of claim 26, wherein the request includes security credentials corresponding to the role.

28. The computer-storage medium of claim 23, wherein the role at the cloud computing service platform has associated privileges to send calls to the endpoint.

29. The computer-storage medium of claim 22, wherein:
  the first data object further comprises data defining allowable uniform resource locators (URLs);
  the operations further comprise verifying that the target endpoint is permitted based on the allowable URLs.

30. The computer-storage medium of claim 21, wherein the remote software component provides external functionality, wherein the external functionality provided by the remote software component comprises one of: a scalar function, a table function, or a procedure.

* * * * *

UNITED STATES PATENT AND TRADEMARK OFFICE
CERTIFICATE OF CORRECTION

PATENT NO. : 10,997,005 B1
APPLICATION NO. : 17/028466
DATED : May 4, 2021
INVENTOR(S) : Cseri et al.

Page 1 of 1

It is certified that error appears in the above-identified patent and that said Letters Patent is hereby corrected as shown below:

On the Title Page

In item (22), in "Filed", in Column 1, Line 1, after "2020", insert
--¶(65) Prior Publication Data
US 2021/0124633 A1 Apr. 29, 2021--

In the Claims

In Column 32, Line 6, in Claim 25, delete "XML," and insert --XML-- therefor

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*